(12) United States Patent
Daniel et al.

(10) Patent No.: US 7,618,260 B2
(45) Date of Patent: Nov. 17, 2009

(54) WEARABLE MODULAR INTERFACE STRAP

(76) Inventors: Simon R. Daniel, Rowhills, Farmham, Surrey, Abbotswood (GB) GU9 9AU; Christopher Verity Wright, Frigg's Mill, 116 Bath Road, Stroud (GB) GL5 3NX ( * ) Notice: Subject to any disclaimer, the term of this patent is extended or adjusted under 35 U.S.C. 154(b) by 231 days.

(21) Appl. No.: 10/590,921

(22) PCT Filed: Feb. 25, 2005

(86) PCT No.: PCT/GB2005/000716

§ 371 (c)(1),
(2), (4) Date: Jul. 5, 2007

(87) PCT Pub. No.: WO2005/083546

PCT Pub. Date: Sep. 9, 2005

(65) Prior Publication Data

US 2007/0279852 A1  Dec. 6, 2007

(30) Foreign Application Priority Data

Feb. 27, 2004 (GB) ................................. 0404435.0
Jul. 7, 2004 (GB) ................................. 0415260.9

(51) Int. Cl.
*G04B 47/00* (2006.01)

(52) U.S. Cl. .......................... 439/37; 368/13; 439/528; 439/953; 24/311

(58) Field of Classification Search .................. 439/37, 439/953, 372, 928, 528; 368/10–13, 281, 368/282; 361/679.03; 24/311, 265 WS; 379/430

See application file for complete search history.

(56) References Cited

U.S. PATENT DOCUMENTS 4,586,827 A  5/1986  Hirsch (Continued)

FOREIGN PATENT DOCUMENTS

EP        0366875 A2    5/1990

(Continued)

OTHER PUBLICATIONS

European Search Report for Application No. GB0415260.9 dated Sep. 8, 2004 (1 page).

(Continued)

*Primary Examiner*—Neil Abrams
(74) *Attorney, Agent, or Firm*—Conley Rose, P.C.

(57) ABSTRACT

A wearable modular interface strap device for supporting multiple module units comprising a flexible strap with a plurality of electrically connected nodes acting as docking points to serial bus interface and mechanically connect removable modules, with the strap being 10 mechanically lockable in a loop by a clasp containing hub and host circuitry to enable network communication between modules and to a universal connector plug for recharging and data-exchange when the connector plug has been released from the clasp. Said strap containing a plurality of electrical wires between control circuitry and nodes and arranged to be wearable as a wristband, alternatively as a wrist device that when opened forms a curved handset with audio input and outputs at alternate ends, or arranged in a necklace configuration. Said device capable of supporting interchangeable modules such as displays, control devices, rechargeable batteries, a module with removable earpiece units, and a plurality of functional modules suitable for communication, data storage, location and environment sensing.

33 Claims, 18 Drawing Sheets

U.S. PATENT DOCUMENTS

| | | | |
|---|---|---|---|
| 4,604,772 A * | 8/1986 | Arff | 24/68 R |
| 4,847,818 A | 7/1989 | Olsen | |
| 4,873,677 A * | 10/1989 | Sakamoto et al. | 368/204 |
| 5,008,864 A * | 4/1991 | Yoshitake | 368/10 |
| 5,239,521 A | 8/1993 | Blonder | |
| 5,265,272 A | 11/1993 | Kurcbart | |
| 5,381,387 A | 1/1995 | Blonder | |
| 5,467,324 A | 11/1995 | Houlihan | |
| D380,476 S | 7/1997 | Zichert | |
| 5,872,744 A | 2/1999 | Taylor | |
| 6,035,035 A | 3/2000 | Firooz | |
| 6,212,414 B1 | 4/2001 | Alameh | |
| 6,249,487 B1 | 6/2001 | Yano | |
| 6,459,890 B1 * | 10/2002 | Kim | 455/351 |
| D466,829 S | 12/2002 | Hsia | |
| 6,529,713 B1 | 3/2003 | Seymour | |
| 6,536,941 B1 | 3/2003 | Fang | |
| 6,549,791 B1 * | 4/2003 | Jeon et al. | 455/572 |
| 6,619,835 B2 | 9/2003 | Kita | |
| 6,619,836 B1 | 9/2003 | Silvant | |
| 6,681,014 B1 | 1/2004 | Ghassabian | |
| 6,757,389 B2 | 6/2004 | Firooz | |
| 6,775,205 B1 * | 8/2004 | Sporn | 368/10 |
| 6,801,476 B2 * | 10/2004 | Gilmour | 368/13 |
| 2001/0043514 A1 | 11/2001 | Kita | |
| 2004/0151071 A1 * | 8/2004 | Kocher | 368/10 |
| 2005/0237704 A1 * | 10/2005 | Ceresoli | 361/683 |
| 2007/0064542 A1 * | 3/2007 | Fukushima | 368/282 |
| 2007/0141915 A1 * | 6/2007 | Kim | 439/640 |

FOREIGN PATENT DOCUMENTS

| | | |
|---|---|---|
| EP | 1154583 A2 | 11/2001 |
| EP | 1174049 A2 | 1/2002 |
| GB | 2364614 A | 1/2002 |
| WO | 98/32057 | 7/1998 |
| WO | 00/38393 | 6/2000 |
| WO | 01/79956 | 10/2001 |

OTHER PUBLICATIONS

International Search Report for PCT/GB2005/00716 dated May 31, 2005 (2 pages).
European Search Report for Application No. GB 0404435.0 dated May 7, 2004 (1 page).
Computer Generated English translation of EP 1174049.
Computer Generated English translation of WO 98/32057.

* cited by examiner

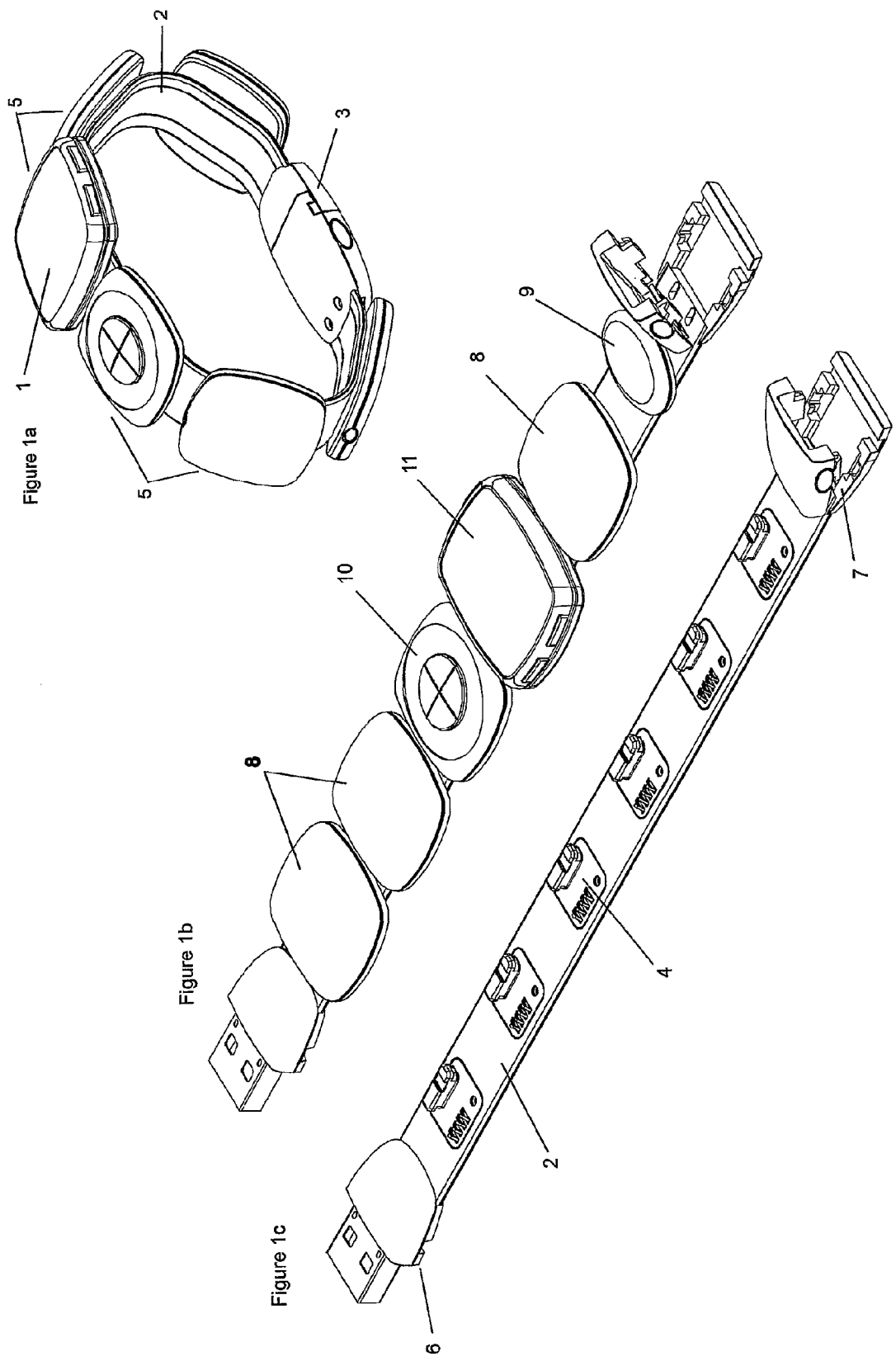

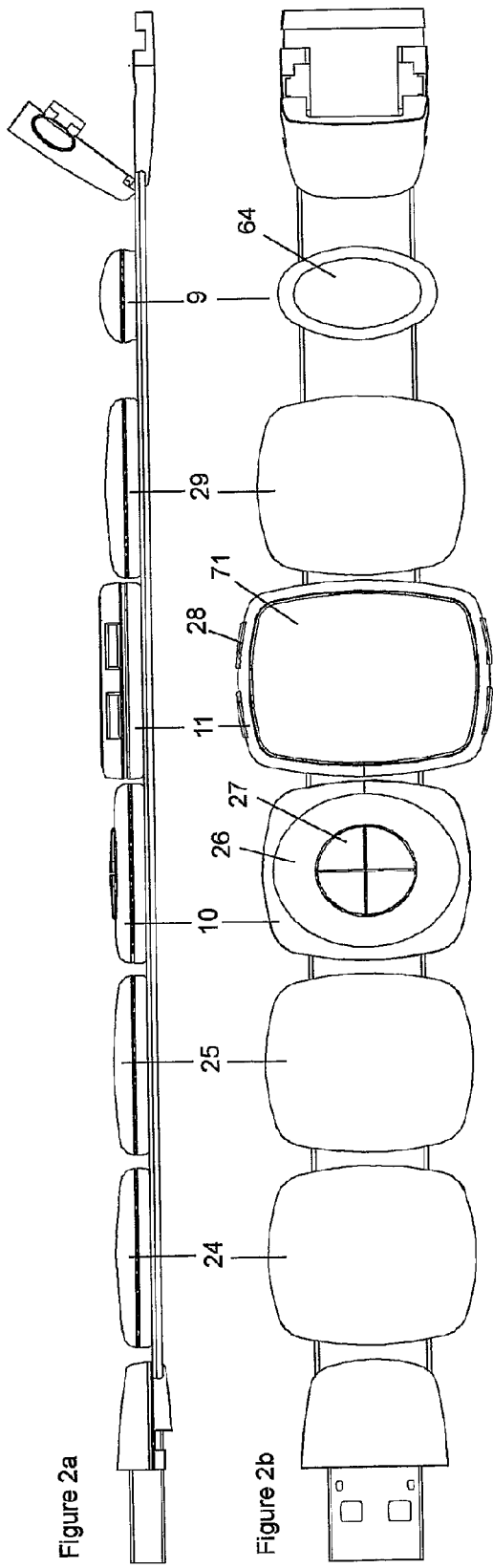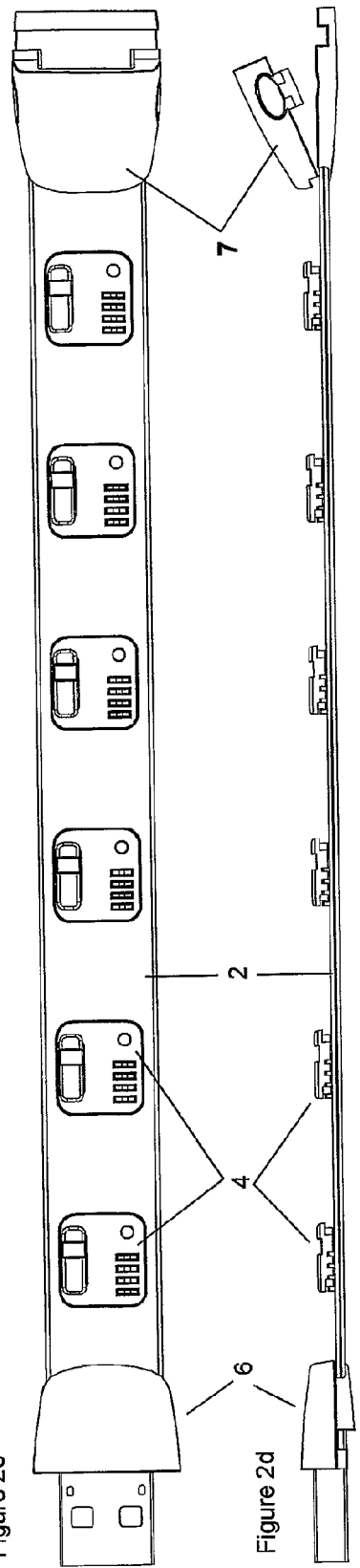
Figure 2a  Figure 2b  Figure 2c  Figure 2d

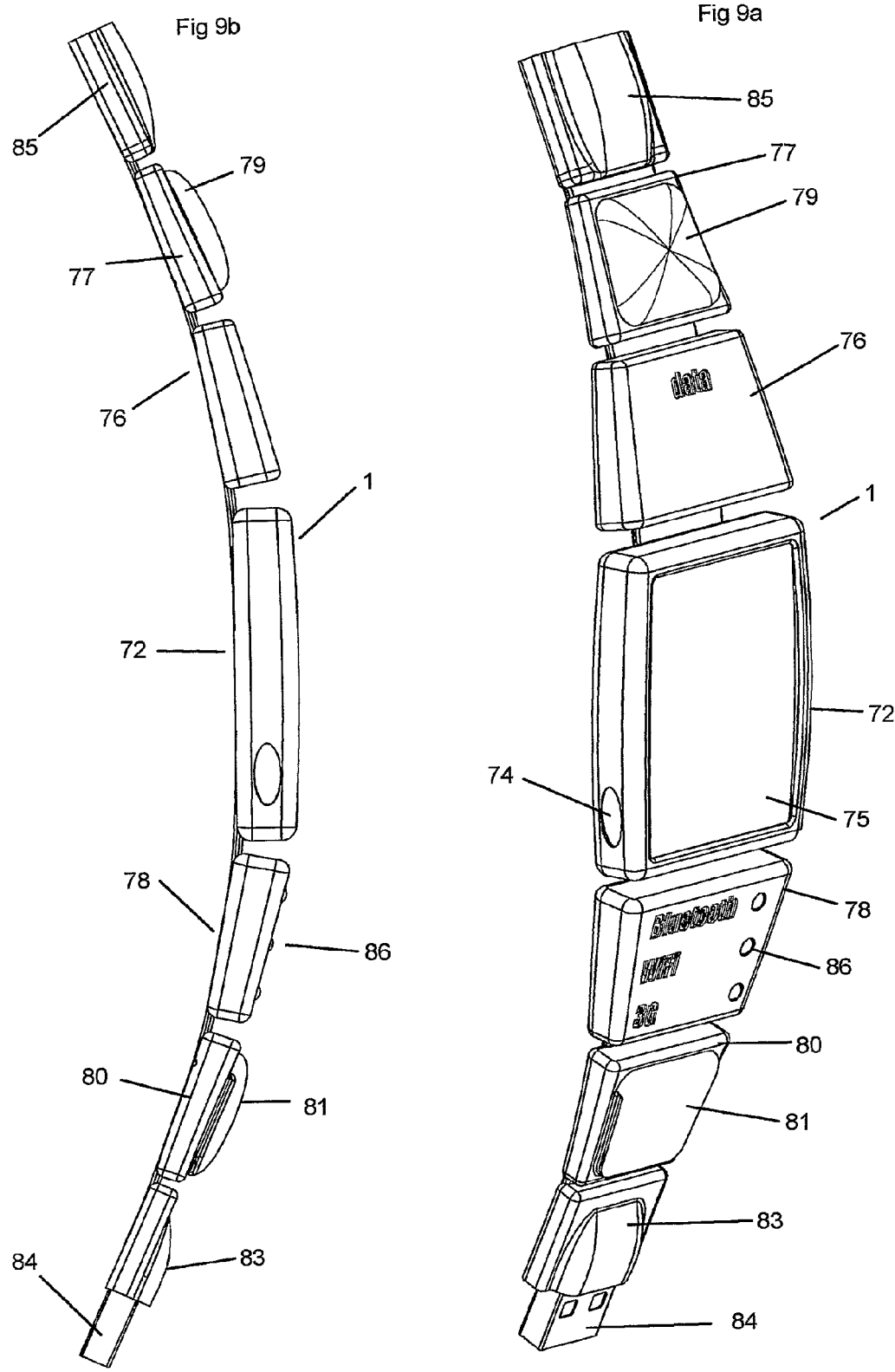

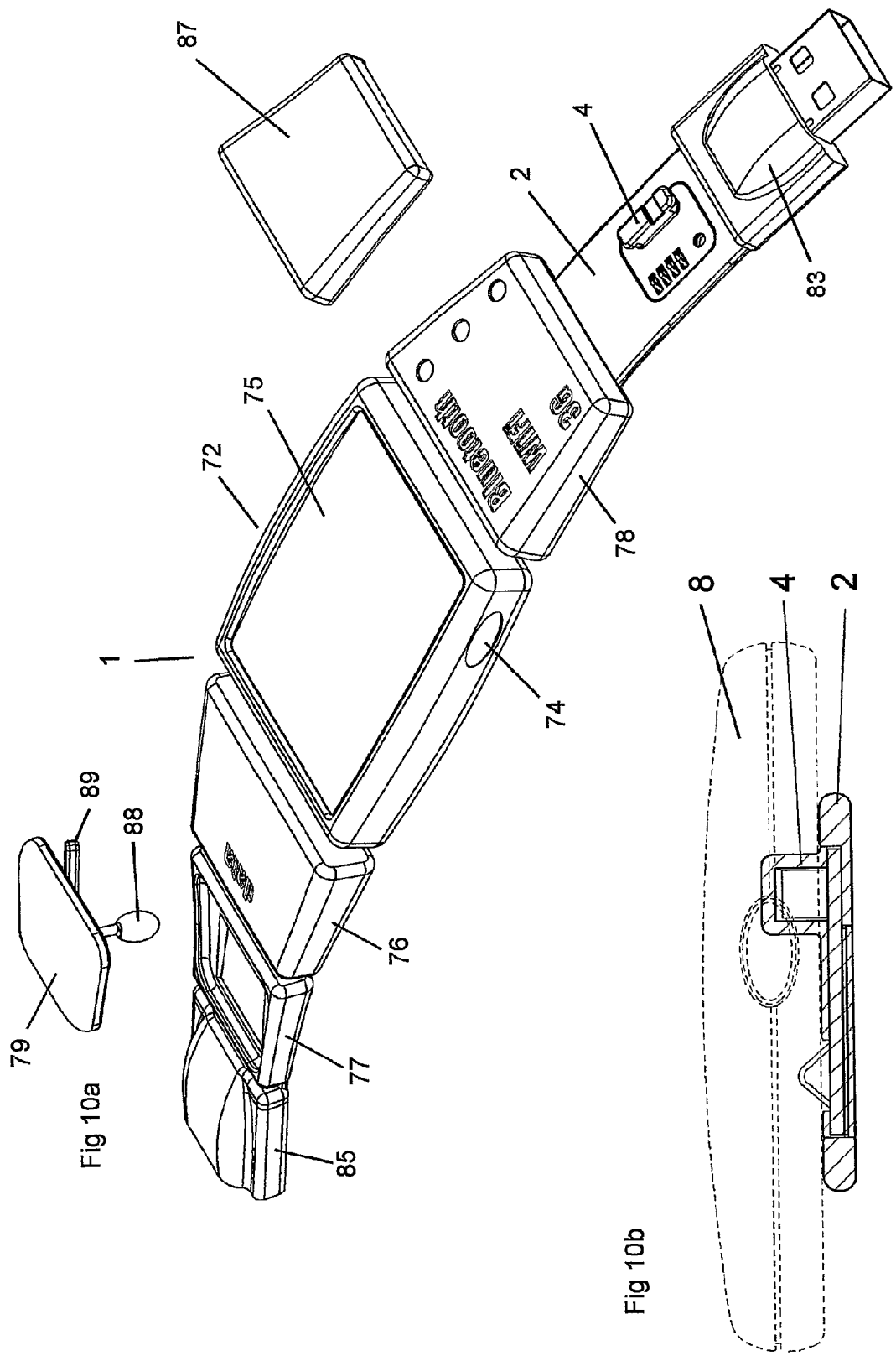

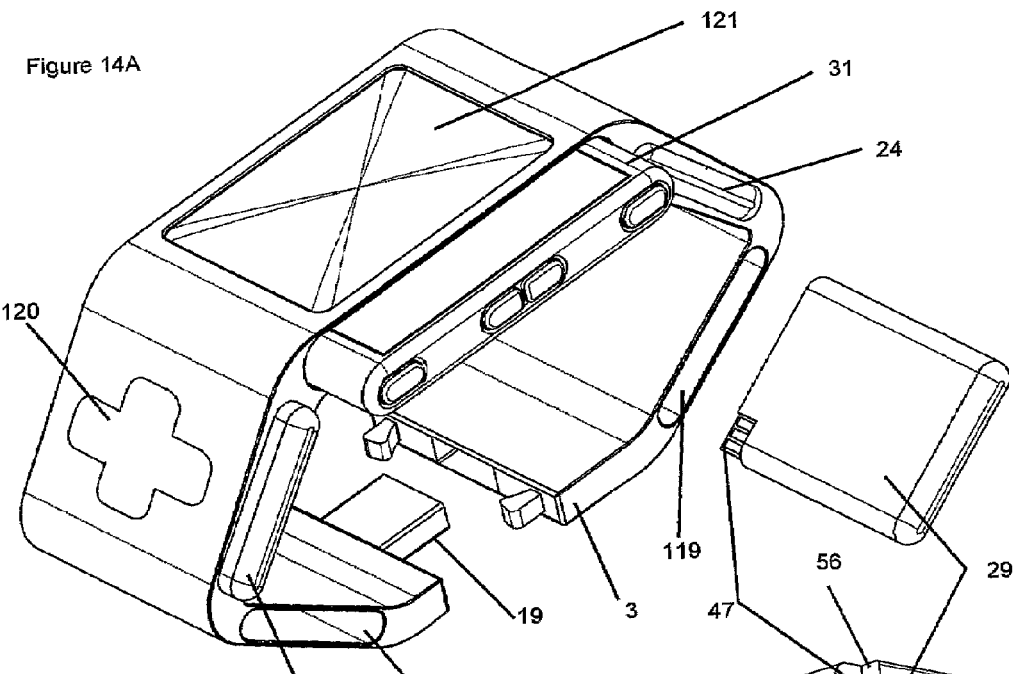
Figure 14A
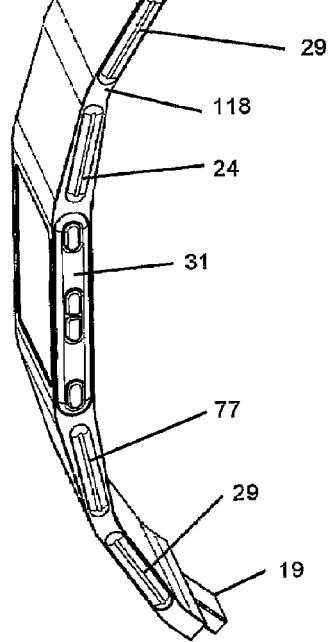
Figure 14B
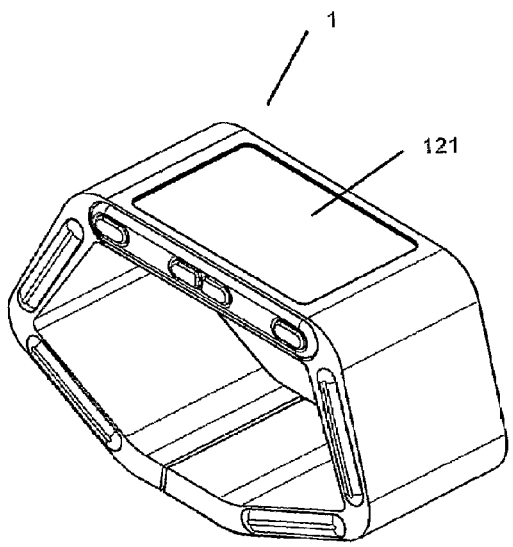
Figure 14C

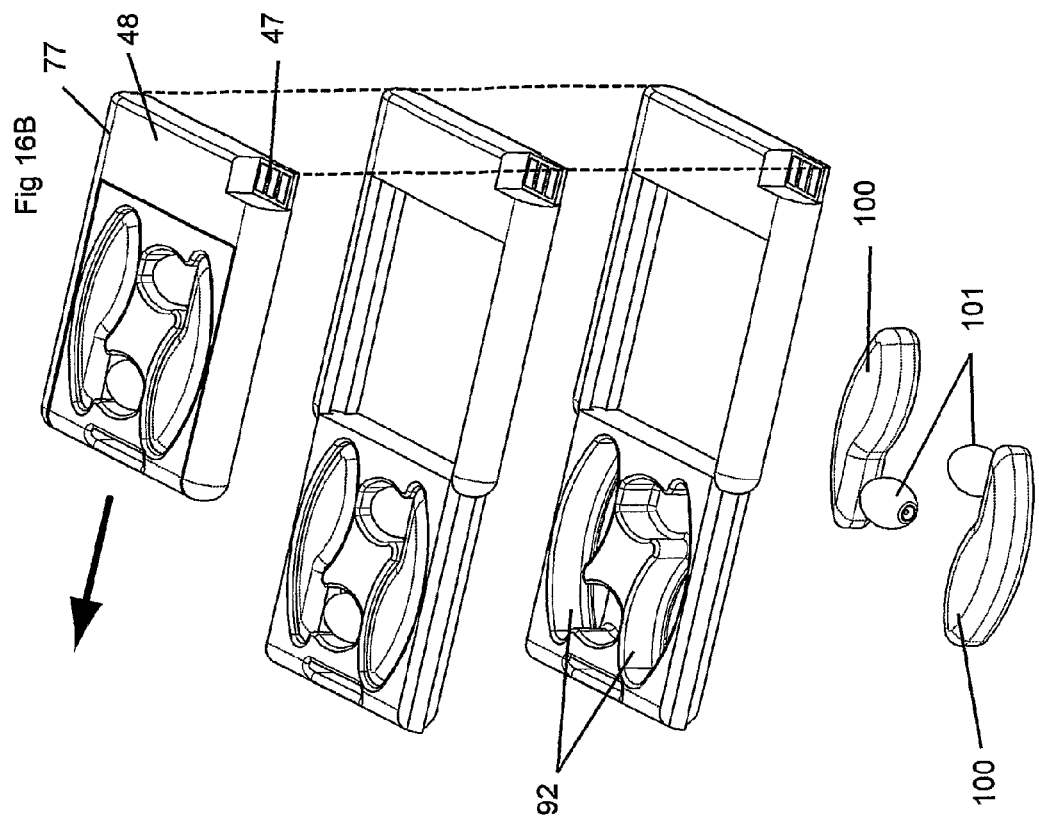
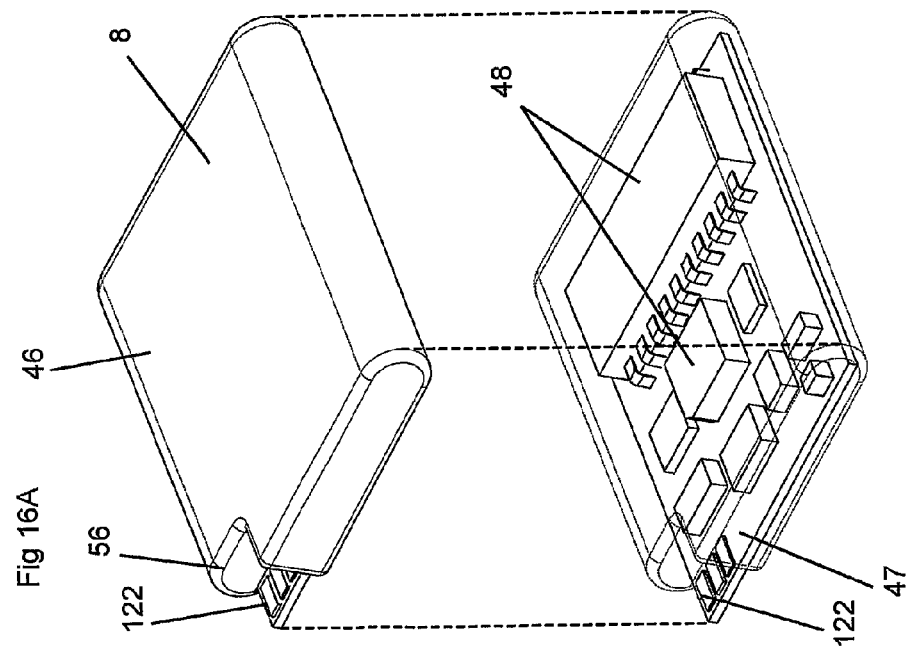

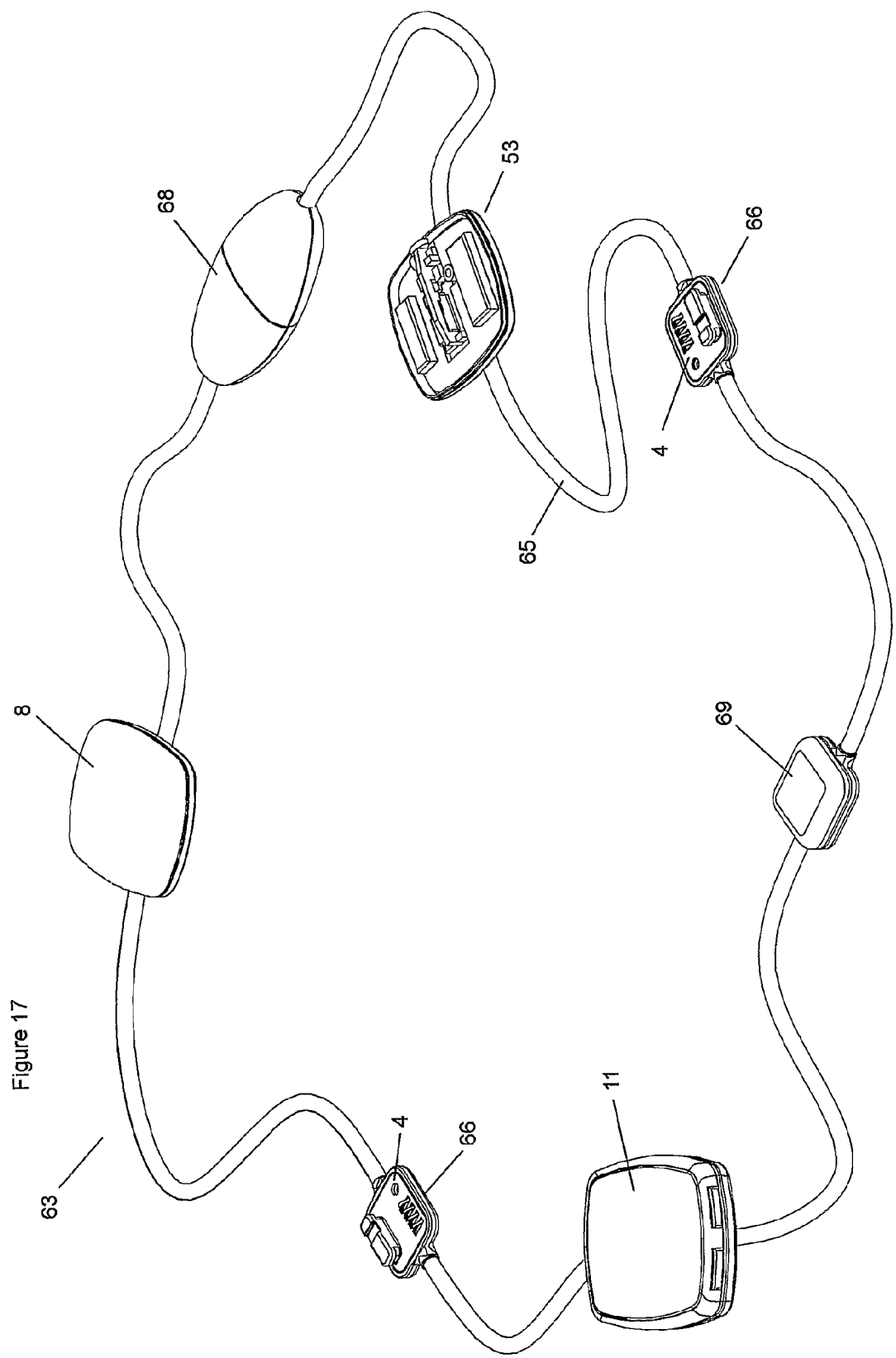

Figure 18
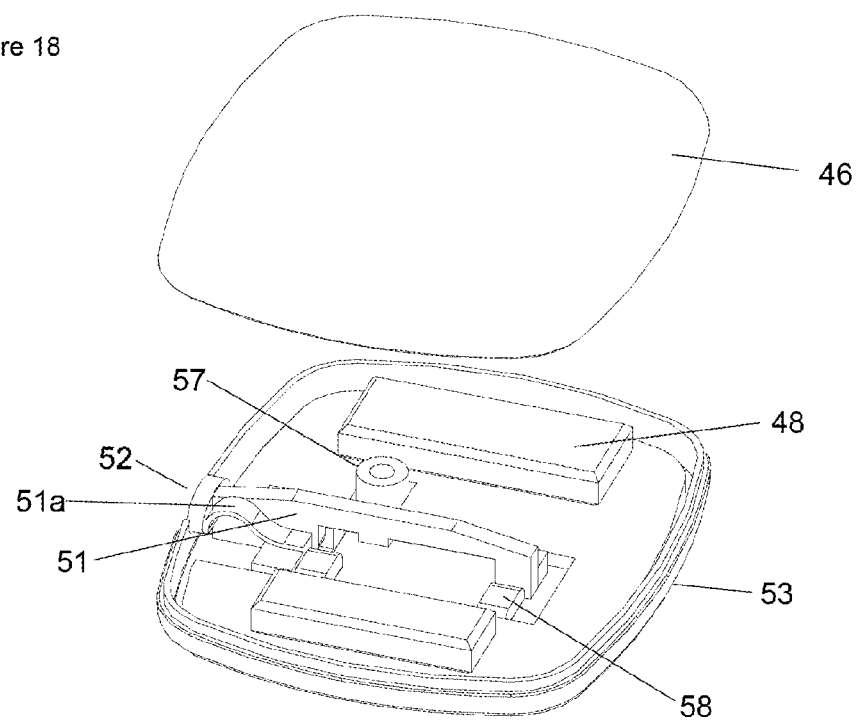
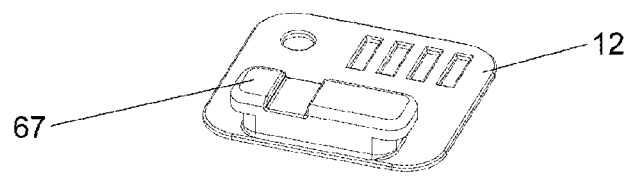
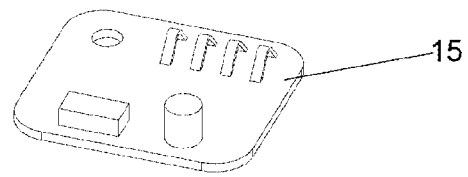
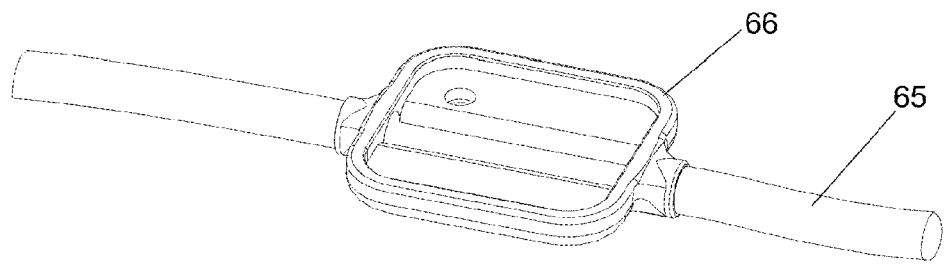

WEARABLE MODULAR INTERFACE STRAP

This application claims benefit of PCT Application PCT/GB2005/000716 filed on Feb. 25, 2005, which claims benefit United Kingdom Application No. 0415260.9 filed on Jul. 7, 2004, which claims the priority of United Kingdom Application No. 0404435.0 filed on Feb. 27, 2004.

BACKGROUND OF THE INVENTION

1) Field of the Invention

This invention relates to a wearable modular strap device for supporting multiple module units which are electronically and mechanically connected to the strap and suitable for wearing on the person, either in a wristband configuration in one preferred embodiment or as a necklace in another. The present invention comprises a substantially flat flexible strap with a plurality of electrically connected nodes which act as connecting or docking points for removable and interchangeable modules. Said nodes contain connectors to enable electronic data and power connectivity between the strap and the attached module, and provides a mechanical clip mechanism to securely lock modules in place and a release mechanism to enable modules to be removed through a lateral sliding motion or changed without having to remove the wristband. Said strap contains a joiner clasp unit at each end suitable for easily securing the strap together at each end of the wristband or necklace, and containing a mechanism for varying the length of the strap. Said joiner clasp also containing a universal connector plug suitable for connecting the overall strap when open to a connector or port on an external device to facilitate data exchange, communication and power recharging. Said clasp containing suitable hub electronics and controller chips to manage connectivity to and between each of the individual connecting nodes and modular devices attached to the strap such that the strap can function both as a interface hub with multiple ports when open and as a personal wristband network when closed. Said removable modules would consist of at least a central unit capable of displaying information, a combined or separate unit suitable for control as a user interface, a rechargeable battery unit, and functional units for data storage, communication, external sensing and other electronic devices. Said removable module units could also consist of a dummy or filler unit suitable for covering the docking point where no functional unit was attached, and used largely to provide personalised ornamental design or simple patterned light effects across the strap.

Said modular device forming in a preferred embodiment a wrist strap that is wearable as a wrist band and can be opened or deployed as a handset that is suitable for Voice over IP or mobile communication, comprising a plurality of removable modules, thereby enabling easy module substitution for preferred wireless or country specific mobile telephony connectivity, upgradeable data storage and battery modules, and personalisation of modules for consumer choice of alternate device features and ornamental style. The wrist strap supporting a microphone and a speaker at alternate ends, suitable for communication use when used on the wrist or in handset forms, and preferably supports compact earpieces that are demountable for wireless audio usage, where said earpieces are collapsible through mechanical and bi-stable material means. Said strap preferably also supporting a generic electromagnetic signal sensor, to indicate availability of signals for general connectivity and interest purposes. Said overall strap forming a portable communication device and being upgradeable to support a plurality of features via changing modules, where said modules can generally be removed from the strap directly when worn as a wristband or when the device is open.

Previous wearable devices are generally implemented as dedicated devices, or central devices with limited direct expansion units, restricting the ability of consumers to personalize the overall appearance to their preferred style and to customize the features of the device. Such devices are difficult to personalize and become rapidly obsolete as soon as a new feature is available.

A major problem with the consumer house-hold and office adoption of broadband Voice over IP at desktops is the non-availability or inconsistency in quality of microphone and speakers, as well as the difficulties in changing desktop phone behaviour, such that making a Voice over IP call to a third-party can be frustrating or impossible, and is generally restricted to certain guaranteed or reliable calls within an established peer to peer network, or when used by someone comfortable with their desktop microphone/speaker arrangement to connect to the external telecom network via a Voice over IP bridge. Similarly new cordless phone devices, that connect to a users desktop, require configuration, and are limited as with existing non IP cordless phones, to being custom devices that are not readily portable and usable across platforms, and generally require households to have multiple handsets if they want quick access from multiple rooms, or to duplicate communication technology.

A major problem with the mobile uptake of broadband Voice over IP services via the traditional mobile phone is in part that commonly used VoIP codecs (such as H.323 or SIP protocols) run more reliably on consumer bandwidth links typically around 128 kb/s initially when compared to say GSM (which typically supports a dedicated voice or data call via a GSM specific codec over a 9600 bit/s digital link to a base station) or GPRS based telephony communication. This means that wireless VoIP services are generally only available at short-range at broad-band based wireless hotspots, or on higher bandwidth 3G type services. However, packet based communication via VoIP provides routing, switching, control and additional functionality (such as contextual telephony, where data and voice can trigger local information or database retrieval giving dynamic information relevant to the incoming caller) as well as being more economic as provide consumer choice and enable users to consolidate services for broadband internet access, telephony and media access. Early implementations also suffer from network delay, jitter when network traffic becomes an issue. Consumers can therefore be reluctant to substitute or duplicate their preferred mobile phone handset, with a device that only works in certain situations, and frequently defer upgrading/switching to hybrid VoIP enabled handsets until the technology is more readily available and reliable. Major commercial, monopoly and legacy reasons also slow down the rate at which major telecom companies provide handsets that are dynamically switchable between higher margined GSM/GPRS/3G services to nearby local wireless bandwidth hotspots or restrict access to preferred local wireless providers. This is in part as the local link could be provided by any third-party, as is currently emergent in the availability of 'free' wireless in dense cities by piggy backing on spare bandwidth within wireless hotspots. A result is that consumers may generally not replace their traditional mobile phone form-factor device with an equivalent VoIP enabled phone, or buy a dedicated VoIP phone until the technology matures and is more universal, despite the advantages in functionality and integration such systems can give, as well as the lower support costs in switching, routing and control technology.

Accordingly there is a need for an alternative platform that helps support faster migration to VoIP technology that provides VoIP or general communication via an easily portable handset device that can easily work with a nearby computer or base station, and is readily upgradeable to support better connectivity means as and when they become available and can be easily personalized to consumer technology and style values. There is a major benefit in this form-factor being different and wrist-based (using different 'body' real-estate) compared to traditional mobile phones, as consumers could be more likely to adopt a more portable wrist-based platform for VoIP whilst maintaining a separate phone, particularly for house-hold, office and general hotspot use which diverts to the cheapest available bandwidth supply, until such time as similarly compact mobile phone GPRS or 3G technology is available to warrant disposing of a separate mobile phone. Similarly early wrist-based GPRS/3G phones are likely to be bulky and face very short product life-cycles as they become rapidly obsolete in terms of size and features as new technology emerges, whereas a modular approach provides for device reuse and module extension at the logical economic and technological point.

2) Description of the Prior Art

There is substantial and diverse prior art relating to instances of wristwatch design, ornamental wrist watch strap design, jewelry bands as well as a growing range of patents on different electronic wristwatches focused on providing a single main unit that acts as communication devices, or radios, data storage, calculators, cameras, global positioning systems and/or health sensors. Some patents disclose a single main unit which utilizes a dedicated wrist strap for battery storage, antenna purposes or additional units, or to contain an external connector.

However, no such prior art has all the features described and claimed herein, and in particular none describes a modular wrist strap architecture for supporting a plurality of devices and suitable for extendable wearable computing with third party devices. As an example no such examined prior art discloses a modular wristband assembly for mechanically and electronically connecting removable units, neither do they show a wristband device architected as a distributed USB ('Universal Serial Bus') Hub with nodes and electronics distributed in a linear and modular strap configuration to provide a plurality of mini-USB type connector docking points across a wristband strap. Furthermore, our invention provides an extendable architecture for customizing both the appearance and the function of the wristband by providing a simple mechanism for interchanging, upgrading and replacing modules as technology advances enable miniaturization and new functions on individual module components, without a need to replace the entire wristband.

By way of example U.S. Pat. No. 6,249,487 by Yano et al (assigned to Casio Computer Co) filed July 1999, discloses a typical approach for compact miniaturization of an advanced electronic wristwatch application (a Global Positioning System watch in this case) in a single main instrument body with volume absorbed in the main device for power, display, control and device functions. Similarly, U.S. Pat. No. 6,536,941 by Pang, filed April 2002, discloses a dedicated wrist worn personal Flash (Data storage device) constituting a main watch/storage device which is coupled through the strap to an external connector at the end of the strap. GB2364614 by Yong-Woo et al, (assigned to Samsung Electronics Co Ltd) describes a main instrument body containing a mobile phone with separate battery pack unit. Similarly U.S. Design Pat. D466,829 by Wada (assigned to Seiko) describes a typical design for a compact mobile wrist phone. U.S. Pat. No. 4,847,818 by Olsen (assigned to Timex) describes a central main unit radio-telephone with wires connected through the strap to a connector clasp which contains a microphone and earpiece at each end of the strap.

There is also substantial and diverse prior art relating to instances of wrist-phone implementations, earphones in general, and wearable portable devices as dedicated or hybrid devices. However, no such prior art discloses using our modular approach to wrist-phone and handset implementations that can be easily upgraded or customised to geographic and user preferences, or combination with demountable earpieces that can be conveniently stored on the wristband when not in use.

Some prior art teaches distributing a phone, battery and electronic functionality across the entire strap to form a single overall device. E.g. U.S. Pat. No. 5,872,744 by Taylor (assigned to Motorola Ltd), describes a generic design of radio-telephony device where a main unit is connected to a series of hinged battery units or PC-boards that form the overall strap. U.S. Pat. No. 6,212,414 by Alameh et al (assigned to Motorola Inc), filed April 1999 similarly describes a general approach for a dedicated radio telephony device which distributes battery and electrical components throughout the strap in order to reduce the size and electronics in the main unit which in this case is partly detachable, as well as suggesting potential incorporation of a recharging jack in the strap clasp. U.S. Pat. No. 5,265,272 by Kurcbart describes a strap design that is assembled by modular interconnecting units (similar to a traditional jewelry band or metal watch chain strap) that form both a strap and could carry electrical connectivity and loop antenna suitable for incorporation with a central unit.

Examples of prior art with central main units linked to distributed strap units include the watch device U.S. Pat. No. 6,619,836 by Silvant (assigned to Swatch), WO9832057 by Caballe which describes a main unit instrument body with separate detachable modular side unit that connects directly into the main unit. WO0038393 by Fourie describes a generic design for a central watch/main processing unit, with additional detachable modules arranged around a strap. U.S. Pat. No. 4,586,827 by Hirsch describes a wiring approach for a wristband information system where a central unit attaches mechanically to a plurality of wires in the strap, enabling the wires to act as antenna or connect directly to additional PC-board modules at different points of the strap. U.S. Pat. No. 6,619,835 by Kita (assigned to Casio), filed May 2001, discloses a similar wristband system with a central unit connected to a custom removable strap containing wires which branch either side of the main unit and support extendable memory modules on one side and sensor modules on the other, controlled by circuitry in the central module, where said strap being unplugged from the central unit in order to slide on or change modules.

Examples of prior art on earphone devices include U.S. Pat. No. 5,239,521 and U.S. Pat. No. 5,381,387 by Blonder, where a fold out section of the strap provides a microphone or speaker. D380,476 by Zochert discloses a retractable earpiece attached to a phone, and U.S. Pat. No. 5,467,324 by Houlihan shows a similar deployable voice-port. Similarly U.S. Pat. Nos. 6,757,389 and 6,035,035 by Firooz shows a further example of deployable voice-port or fold-out mobile handset. An earlier patent, U.S. Pat. No. 5,008,864 by Yoshitake, discloses the general principle of using a wrist-device as a wrist phone and handset, similarly U.S. Pat. No. 6,529,713 by Seymour (assigned to Nokia), discloses a specific design of wrist-phone where a whole handset is demountable from the strap.

In reference to the demountable earpieces, no such prior art examined has all the features described and claimed herein, and in particular none describes the combination with a modular architecture, where said earpieces are designed to be compact by collapsible and bi-stable material means, and due to modularity can be readily substituted with user preferred earpiece forms and sizes. Neither do they disclose the convenience of using a USB type hub and network approach to allow multiple vendors to readily integrate suitable modular components that could provide firstly a USB wireless link for Voice over IP wrist-phone usage in proximity to a nearby base station, a Bluetooth or WiFI wireless linkage module for short range connectivity, and ultimately a GSM, GPRS or 3G module to provide connectivity for VoIP or general mobile communication in general.

To the best of the applicant's knowledge, the prior art, whilst suggesting some features and numerous variations of wristwatch and portable wearable devices in general, the prior art has not disclosed some of the highly advantageous features of the present invention discussed herein.

SUMMARY OF THE INVENTION

The main object of the present invention is to provide an extendable architecture for customizing both the appearance and function of advanced electronic wristband or necklace devices by providing a common modular framework for electrically and mechanically supporting a plurality of new devices, and to enable the customer rather than the supplier to select the features, functions and specification they desire as new modules become available as well as customize the overall appearance to individual style and fashions. In a preferred embodiment this can be configured to provide a modular wrist-phone that can be deployed as a generic portable handset for Voice over IP or mobile communication, or used on the wrist in conjunction with demountable wireless earpieces or microphones that are conveniently stored on the wrist-band when not in use. Similarly the device could be configured for portable music player, Personal digital assistant or phone applications.

The wearable modular strap, of the present invention, in a preferred embodiment comprises a substantially flat flexible strap supporting a plurality of electrically connected nodes which act as connecting or docking points for securing multiple removable module units. Said nodes being connected by wires within the strap and preferably arranged in a longitudinal direction and containing connectors acting as a serial bus to enable electronic data and power connectivity between the strap and the attached module and containing local resistors, circuitry and capacitors within the node unit to facilitate hub port functions and power management such as limiting downstream current surges when hot-attaching a module. Said nodes providing a mechanical clip mechanism to securely lock modules in place and a release mechanism to enable modules to be removed through a lateral sliding motion or changed without having to remove the wristband, and a sprung positioning pin that could optionally be replaced with a screw accessible by removing the wristband for additional fixing. Said strap being affixed to a joiner clasp unit at each end suitable for easily securing the strap together at each end of the wristband or necklace when worn on the person, and containing a mechanism at one end for varying the length of the strap. Said joiner clasp connecting the strap wires to a universal serial bus connector plug contained within the clasp and suitable for connecting the overall strap when open to a connector or port on an external device to facilitate data exchange, communication and power recharging. Said clasp containing suitable hub electronics, clock and controller chips to manage connectivity to and between each of the individual connecting nodes and modular devices attached to the strap such that the strap can function both as an interface hub with multiple ports when open and as a personal wristband network between the modules when closed.

Said removable modules would consist of at least a central unit capable of displaying information, a combined or separate unit suitable for control as a user interface, a rechargeable battery unit or element within another module, and functional units for data storage, communication, external sensing and other electronic devices. Said removable module units could also consist of a dummy or filler cover unit suitable for covering the docking point where no functional unit was attached, and used largely to provide personalised ornamental design or simple patterned light effects across the strap. Said functional units could optionally contain additional advanced power management circuitry and capacitance depending on the requirements of the module as well as local memory, battery units, displays and interfaces.

Said overall wearable modular strap being connectable to a cradle or home port station by means of the universal connector for power recharging, and local functions where said cradle might connect to additional nodes for spare modules or mechanical racks for storing unused modules and filler cover units. Said strap being available in different initial lengths to provide for a range of human wrist and necklace sizes or preferences.

Said overall wearable modular strap, in a preferred embodiment uses a Universal Serial Bus connector as the connector plug, and USB specification compliant Host, Hub controllers and circuitry in the clasp, with suitable power management circuitry and capacitance at the nodes acting as individual serial bus ports, with the four connectors within each node and associated wiring being two of power (a ground line and a Vcc line at +5v) and two of data (a serial data line and clock line), which preferably uses the standard NRZI (Non Return to Zero Invert) encoding scheme to send data with a sync field to synchronize the host and receiver clocks in the usual manner. Alternatively a similar implementation could be achieved using a Firewire Serial Bus system or other Serial Bus approach.

In a preferred embodiment when said overall wearable modular strap device is open and connected by means of the clasp USB connector clip to an external USB port, the external device would take on the role of USB host, whereas when the device is closed and used as a wristband it would act as a local host, using the circuitry on the clasp hub controller and/or circuitry embedded in say a single central interface module. The new USB 2.0 specification provides for greater design freedom in implementing more complex host functionality via the On-The-Go specification which introduces a host negotiation protocol, and there is also design flexibility from the original UHCI (Universal Host Controller Interface) and OHCI (Open Host Controller Interface) specifications as to the degree to which any advanced local host functions required are embedded in the hardware controller chips in the clasp and/or module circuitry or as software drivers in say a more advanced central control module. Similarly some modules could use a Wireless USB chip to facilitate easy wireless communication with the strap hub and network.

In a preferred embodiment said overall wearable modular strap is wearable as a wrist band and can be opened or deployed as a handset that is suitable for Voice over IP or mobile communication, with said strap supporting a microphone and a speaker at alternate ends, suitable for communication use when used on the wrist or in handset forms, and preferably supporting compact earpieces that are demountable for wireless audio usage, where said earpieces are collapsible through mechanical and bi-stable material means. Said strap preferably supporting a generic electromagnetic signal sensor, to indicate availability of signals for general connectivity and interest purposes. Said overall strap forming a portable communication device and being upgradeable to support a plurality of features via changing modules, where said modules can generally be removed from the strap directly when worn as a wristband or when the device is open. Said modularity thereby providing an easy method to customise the device for country or user specific mobile telephony connectivity and to provide the user with freedom to upgrade data storage and battery modules, and to personalise the wrist based device for new and alternate device features and consumer choice on ornamental style.

A major benefit of the overall wearable modular strap using the USB or fire-wire standard is that each third-party module can follow a traditional architecture for serial bus communication, greatly facilitating the flexibility and integration of third-party module design as well as to provide a common method of data exchange using a preferred token-based protocol for any device on the wristband to access and use resources such as display/control/memory from any other attached module device. Additional circuitry could be added to the controller chip in the clasp to provide additional inter module functionality, such as a common store of connected devices and resources and additional buffer memory, or such circuitry could be embedded in a central display or interface unit configured to act as a local host. USB offers greater freedom in power management and a key advantage of our modular wristband device enabling physical connection with wearable devices, is that devices can be attached and recharged, whereas wireless devices whilst able to exchange data cannot exchange power wirelessly, so always need to be recharged.

The modular approach therefore provides an extendable architecture for customizing both the appearance and function of advanced electronic wrist-based devices by providing a common modular framework for electrically and mechanically supporting a plurality of new devices, and to enable the customer rather than the supplier to select the features, functions and specification they desire as new modules become available as well as customize the overall appearance to individual style and fashions.

Similarly there is an advantage in such a wrist-based device supporting demountable earpieces or microphones, as they can be easily changed for user preferences, and stored and recharged from the main wrist-strap power source when not in use. Similarly wireless earpiece use in conjunction with the wrist-based device provides for easy use in leisure and vertical applications, such as when walking, running, cycling, where a user could simply remove an earpiece from the strap and position it in an ear, for communication or music player (such as MP3) purposes.

Modules can be attached to a single node or optionally a larger combination module could be attached and affixed on two connector nodes by sliding laterally as with a single module, with at least one connector acting for electrical and power connectivity. Such a module could be used as a central unit with advanced processing or large-scale electronics as miniaturization of radio-telephony devices and other advanced modules such as GPS may take some time. Equally a combination unit could provide scope for selecting a display, control and interface design from a preferred supplier or brand. Similarly a device could be pre-shaped into a curved form and physically attached to a plurality of nodes.

In a further alternative arrangement all the modules on the device could be simply battery units with an ornamental cover, thereby providing a battery magazine or portable power supply suitable for connecting into other wearable devices by means of a simple wire that could be embedded in one module and fold out to connect to the next wristband device or directly into clothing containing a low voltage power membrane. Similarly users could wear multiple modular wristband straps, either on the same arm or on alternate arms which would provide more docking points for more modules, battery and functionality with potential inter-connectivity my means of a wireless communication module. This would be particularly relevant when travelling as users could carry additional batteries or storage, which might be relevant when say using a camera module. Likewise a module with removable lid could be produced which could hold a disposable battery or a battery could be custom produced with an equivalent receiving docking port such that it could be simply plugged directly onto the node on a strap.

A key benefit of the modular strap approach compared to existing prior art devices that focus around delivering a single device or dedicated main body/strap is that there are many potential wristband technologies, suppliers and third-party devices emerging with different product cycles which will take time to stabilize and be aggregated into single custom wristband devices, however, for the modular approach these emergent technologies could be incorporated faster as individual modular units as and when they become available, enabling a faster and more economic take-up by the consumer. Examples include compact data and media storage and players for MP3, wireless communication devices such as Bluetooth as well as compact radio-telephony units, digital radio, health/environment sensors, security tags, location sensors, cameras, microphones, flexible fold out screen displays, removable wireless earpiece connectors.

A further benefit of the modular approach is that it avoids the wasteful and rapid obsolescence of technology where users have to replace an entire wrist watch device to upgrade to a better specification or add a new function. This is likely to be of increasing benefit as environmental considerations raise user awareness about wasteful product cycles. An example of this is perhaps the short-lived product cycle for single unit camera watches which were largely superseded by mobile phones which incorporated camera elements, whereas a modular approach could have allowed adding a mobile unit, advanced camera or additional memory as and when the user required it and to their desired specification, or to replace a device with a smaller less clunky unit, which is a buyer value as technology miniaturizes. A further example is to avoid the problem of overall device obsolescence when a component fails or reaches its maximum lifetime (e.g. a battery with limited number of recharges), which could simply be architected easily as a removable or upgradeable module. The modular wristwatch strap is therefore expected to be a personal wristband which provides continuity across a range of devices the user selects rather than a single purpose product and therefore potentially has a longer product lifecycle than some individual module components.

Of particular benefit is the ability the modular strap offers for users to exchange modules with colleagues, or to possess additional modules and to adapt the wristband depending on their activity. By way of example a user might use a docking cradle at home to store a plurality of modular devices, and substitute a memory unit with say a GPS (Global Positioning System unit) when they go jogging, or to add a compass/emergency unit when they go camping. In a corporate context, users could carry project based data banks or security tags on the strap and exchange modules containing secure information or receive a welcome module with data when arriving at a location. Similarly conferences and retail stores could distribute modules containing custom data such as sales material or conference packs, or sell music and media as an instant unit which could be attached to the wristband. In a vertical application such as a hospital or nursing home, health sensor modules could be added to monitor particular characteristics as and when they are needed, as well as being able to substitute the communications module with an appropriate technology that works in that environment, office or country. Modules could also be recycled or sold when they are no longer needed by users.

Similarly a user might possess a compatible necklace or pendant strap and be able to substitute modules as they desire, with similar strap configurations being possible on a belt, in isolation as a cufflink when combined with an embedded wireless device, or as part of a sunglass frame side.

Accordingly the overall wearable modular strap device could therefore transform the wristband into a truly viable multi platform for portable wearable computing which could be adapted by the user for their specific functions and aesthetics.

BRIEF DESCRIPTION OF THE DRAWINGS

The accompanying drawings illustrate presently preferred embodiments of the present invention and together with the detailed description serve to explain the principles of the present invention.

FIG. 1A shows a three dimensional view of the modular wristband strap in a closed configuration, as it might appear on a wrist, FIG. 1B shows the wristband open and arranged flat with several modules and a filler cap attached, FIG. 1C shows the modular wristband strap without any modules attached.

FIGS. 2A and 2B shows a side profile and plan view of the wristband strap device in an open configuration and supporting a plurality of module units. FIGS. 2C and 2D shows a side profile and plan view of the wristband strap device in an open configuration without any modules attached.

FIG. 9A shows a three dimensional view of the overall wristband configured as a handset in an open deployed configuration, with FIG. 9B showing a side elevation.

FIG. 10A shows a three dimensional view of the overall modular wristband configured as a handset showing a demountable earpiece and a module removed. FIG. 10B shows a cross-sectional view through the strap and example module.

FIG. 14 shows a three dimensional view of an embodiment of the modular wristband where the strap is formed as a thicker Semi flexible structure supporting side recesses for the removable modules and provides a generally flat external surface over all the modules. FIG. 14A shows an exploded view of this modular wristband embodiment with a large combination central module such as a media player or PDA Device. FIG. 14B Shows a deployed configuration and FIG. 14C a closed configuration as it might appear on a wrist.

FIG. 16A shows a three dimensional view of a module with example internal circuitry and a lateral docking prong connection. FIG. 16B shows a three dimensional example of a earpiece module embodiment supporting a storage and recharging tray for demountable wireless earpieces FIG. 17. shows a three dimensional view of a necklace strap assembly with some modules partly removed for clarity.

FIG. 18. shows an exploded view of a necklace strap docking point and electrical and mechanical connector clip as well as an example module.

DETAILED DESCRIPTION OF THE INVENTION

Figure 3A:
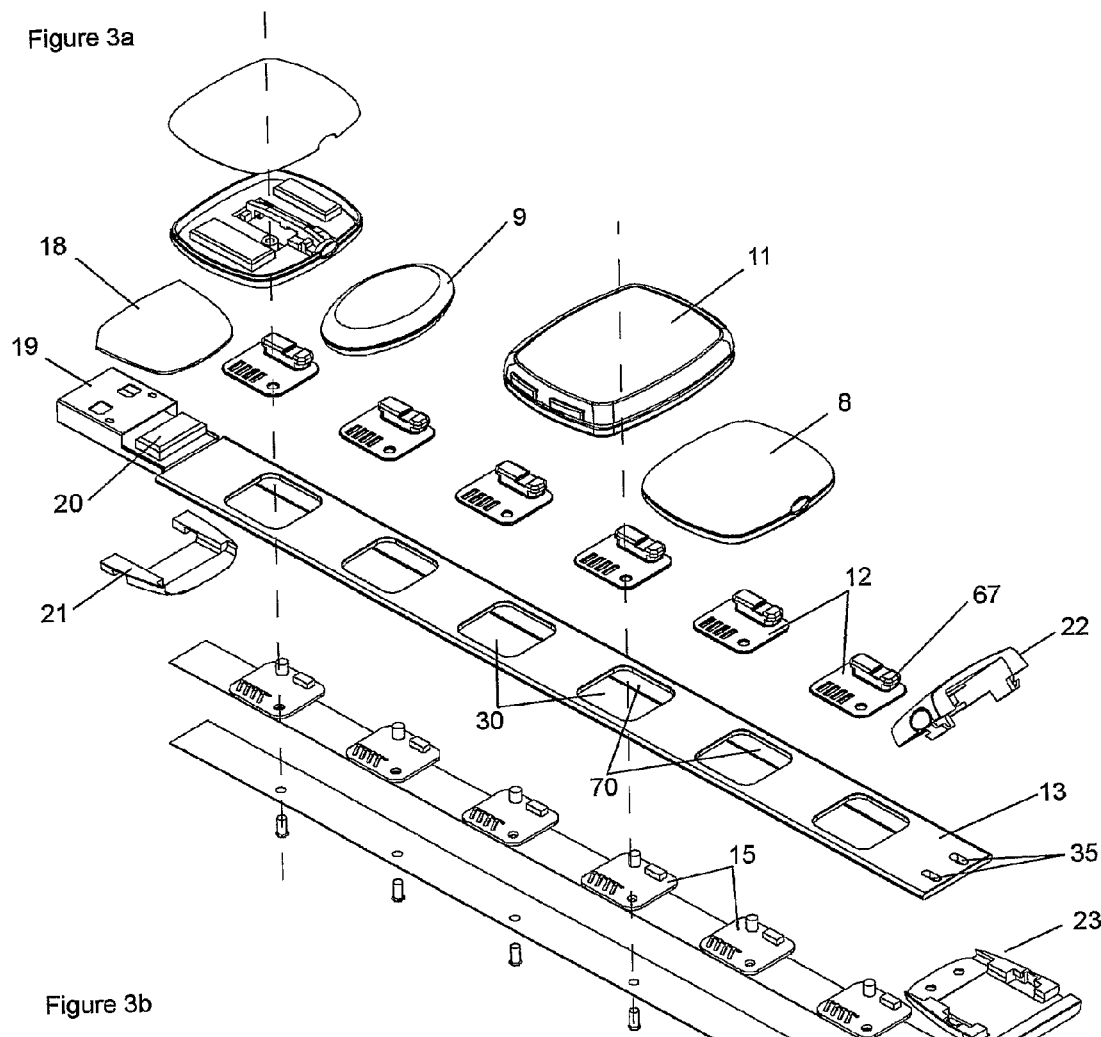
FIG. 3A shows a three dimensional exploded view showing the key components making up the overall modular wristband device assembly, with some modules removed.

Preferred embodiments of the invention will now be described with reference to the accompanying drawings herein:

FIRST EMBODIMENT

Referring to FIG. 1A, which shows a 3-dimensional profile of an overall modular wristband device 1 in a closed configuration which comprises a flexible strap 2 connected to a clasp 3 which joins alternate ends of said strap so as to form a loop, where said strap 2 contains a plurality of removable modules 5 arranged at preferred regular intervals around the strap and secured by means of docking points or nodes 4 which serve to electrically and mechanically connect the strap 2 with the modules 5.

Referring now to FIG. 1B which shows a 3-dimensional profile of the overall modular wristband device in an open configuration supporting a plurality of function modules 8 attached to docking nodes 4 and are shown as example as an interface module 10, a display device 11, an example ornamental filler module 9 which is smaller than other modules and serves to cover the docking node 4, and other modules 8 that as an example could be battery and data storage units. FIG. 1C shows the modular wristband interface device with all modules removed and being comprised of a substantially flat flexible strap 2 supporting a plurality of docking nodes 4 and showing the male 6 and female 7 components of a locking clasp embodiment 3.

Referring now to FIGS. 2A and 2B which shows a plan and side profile of the overall modular wristband device 1 containing a series of modules 8 which in this instance are labelled as functional units 24, 25, 29 and control or interface unit 10 and display unit 11, along with an example filler cap unit 9. By means of example 24 could be a battery module, 25 a communication module and 29 an extended memory module. The control module 10 shows an example touch sensitive roll area 26 with central touch sensitive selector buttons 27. The display module 11 shows a screen 71 which for example might be an LED or LCD or OLED form, and could itself be touch sensitive, along with side control buttons 28. The filler unit 9 shows an example ornamental surface 64 that could optionally be a light emitted surface for patterned light effects or separately changeable when the module 9 is removed. FIGS. 2C and 2D show the corresponding plan and side profile for the overall modular wristband device 2 with no modules attached.

Figure 3B:
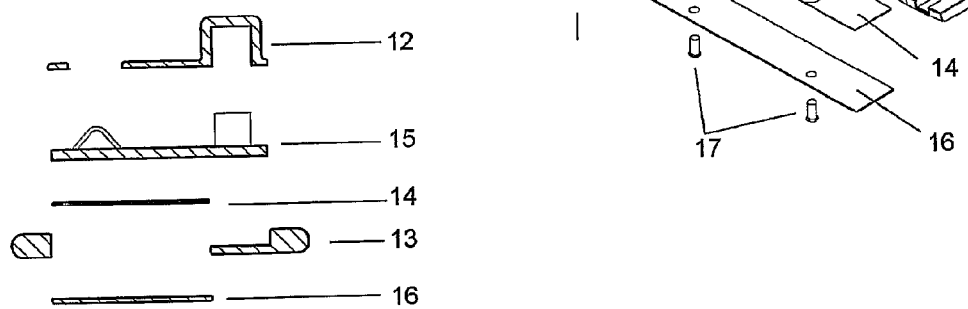
FIG. 3B shows a cross-sectional exploded view through the wristband strap and a connector node.

Referring now to FIG. 3 which shows an exploded view of the overall modular wristband device 1 and breakdown of the strap 2, docking node 4, module 8 and clasp 3 components in more detail. The Strap 2 comprises a top outer layer 13, an internal electrical membrane layer 14 and inner layer 16. Said top outer layer is made from a flexible material such as rubber or plastic and contains holes 30 at regular intervals with a partial ledge 70 and connecting to an external connector 19, which in a preferred embodiment is a USB connector, and supports circuitry 20 that contains at least one hub controller chip, and a plurality of resistors and other control circuitry. The middle layer 14 is a flexible membrane containing a plurality of wires connecting the connector 19 to the individual node circuit boards 15 arranged at regular intervals and capable of being assembled by sliding up through the holes 30 in the top layer 13 and affixing to the ledge 70. The lower layer 16 is a flexible or rubber material which affixes within the recess formed on the bottom face of the top layer 13 and affixes to the bottom face of the membrane 14 and optionally through holes at intervals in membrane 14 to affix directly to the bottom face of 13. Said node circuit boards 15 support and electrically connect additional capacitors 59 and chips and resistors 60 suitable for local power management functions, and four electrical connector prongs 61 (as can be more clearly seen in FIG. 6) as well as a locking hole 62. Said node circuit board 15 is preferably of rigid or semi-flexible material. Said node circuit boards 15 have a corresponding cover 12 made of a rigid or semi-flexible material that covers the circuit board and said capacitors 59 and chips 60 as well as provides slots through which the electrical connector prongs 61 protrude. Said cover also contains a rigid vertical prong 67 with shaped edges that serve to secure the modules 8 in place when connected. The overall assembly of cover 12 and circuit board 15 on the strap layers 13, 14, 16 thereby form the docking node 4 which serves to both mechanically and electrically connect to modules 8. A positioning pin 17 is also shown which would affix through holes 43 in the lower strap 16, and circuit board 15 hole 62 and cover 12 into the module. Such a positioning pin 17 would have a biased triangular bevelled end (Not shown) and be sprung such that it would compress when the overall module 8 is slid laterally, or be replaced with a small screw where modules are to be attached in a more permanent fashion in a screw thread within the module cylinder 57 (See FIG. 6).

Figure 4A:
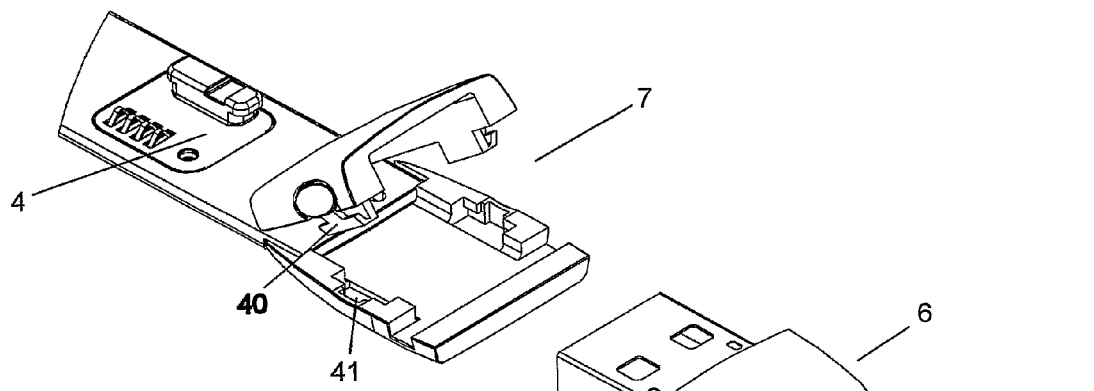
FIG. 4. shows a 3D profile of an example strap locking clasp, and component views showing this in an open FIG. 4A, semi-closed FIG. 4B and closed configuration FIG. 4C.
Figure 4B:
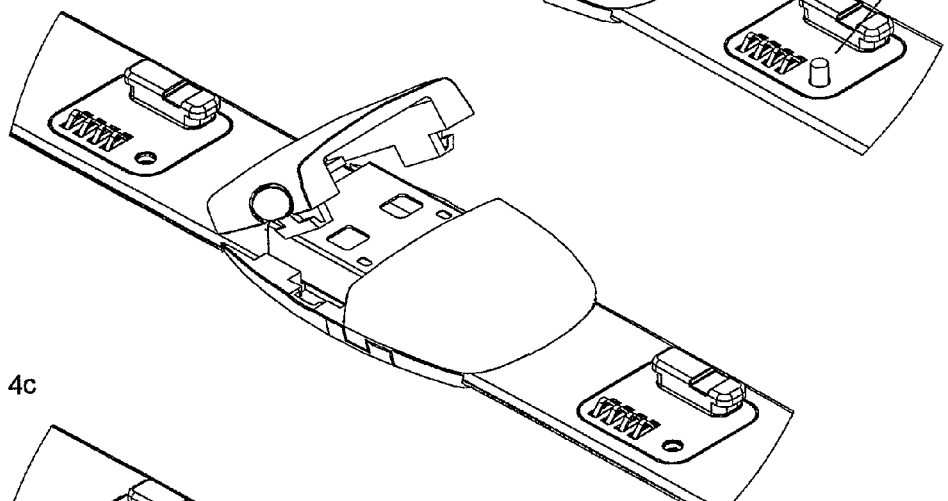
Figure 4C:
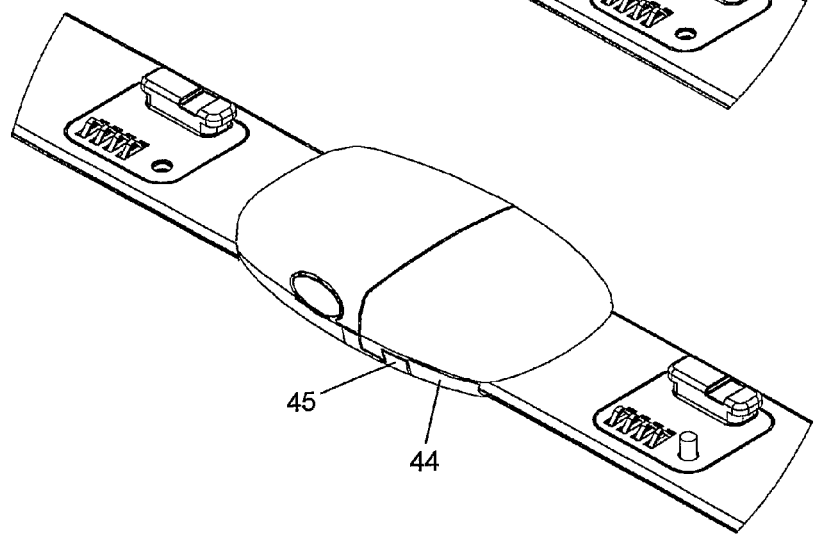
Figure 5:
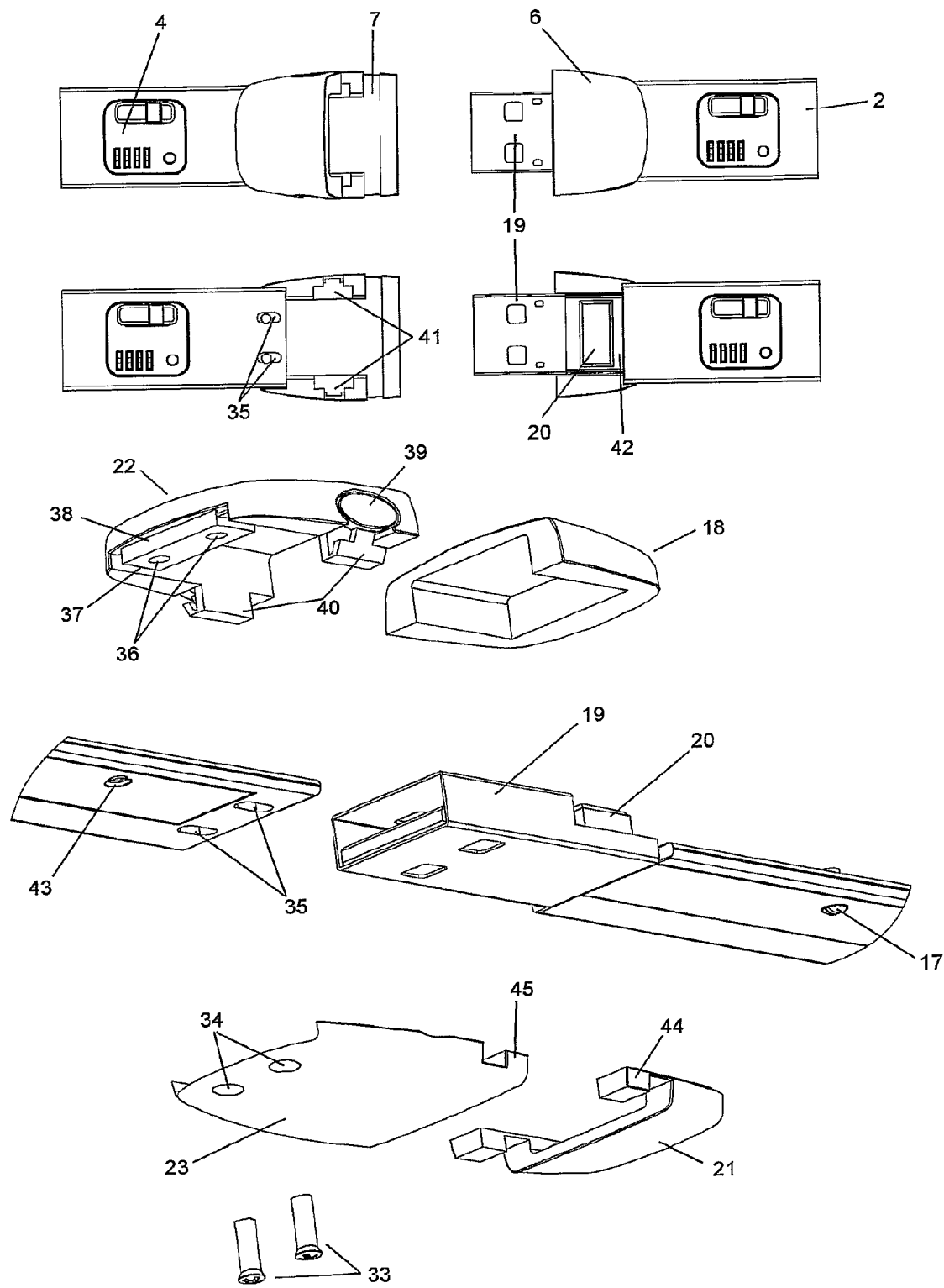
FIG. 5. shows a plan view of the strap locking clasp in an open configuration with the top sections removed for clarity with the lower image showing and an exploded view of the individual components.

FIG. 3 also shows the components of the locking clasp 3 which on one side has male 6 unit comprising a lid 18, USB port and circuitry 20 and base unit 21, and on the other has a female unit 7 formed from a lid unit 22 which is hinged and attached to base unit 23 as will be more clearly seen in FIG. 4 and FIG. 5. Also shown are example modules 8, a display module 11 and an example ornamental filler cap 9.

Referring now to FIG. 4 which shows the clasp 3 at various stages of operation, from an open form FIG. 4A, to semi closed FIG. 4B and closed FIG. 4C. The action is such that the male clasp 6 is lifted over and secured within the lip 45 of the female clasp 7 whilst the lid 22 is open forming the assembly visible in FIG. 4B. To release the clasp the side buttons 39 are compressed which would be attached to a flexible plastic prong 40 that unclips from recess ridge 41 such that the overall lid 22 can hinge upwards from base unit 23 enabling the male clasp 6 to be removed. This overall mechanism is designed so that it could be operated by one hand. By way of example a forefinger holding the strap 2 connected to the female clasp 7 against the underside of an inverted wrist whilst the thumb and middle finger hold the clasp 6 and hook it over the lip 45, with the forefinger then pushing down the lid 22 such that it clicks and locks via the prong 40 and ridge 41. Similarly the thumb and middle finger could be used to compress the buttons 39 to release the mechanism and then used in the same way to open the clasp.

Referring now to FIG. 5 which shows a more detailed plan and exploded view of the clasp 6 mechanism, with the top diagrams showing a plan view of the open clasp and with the top lids 22 and 18 removed for clarity. This diagram more clearly shows the side button 39 on the top lid 22 of the female clasp 7 and the prongs 40 which would spring back slightly as it is pushed into the recess 41 in the lower base 23. Also shown is the hinge 38 between the upper lid 22 and the strap connector block 37 which attaches through the strap 2 to the base unit 23 by means of locking bolts 33 that pass through holes 34, 35 and 36 respectively. The oblong nature of the holes 35 in the strap provide one method of varying the length of the strap slightly as might be required by the user. For longer variations in strap length other straps could manufactured at different lengths with different hole 35 spacing or alternatively manufactured with one end being formed of plastic/rubber suitable for being cut down at point of supply and then connected to the clasp 7 in a similar manner. The hinge 38 on the strap connector block 37 could optionally be formed in the mould itself such that 22 and 37 form a continuous structure joined by a thinner more flexible plastic which would directly provide a small spring action, or could be a metal or other direct hinge. Similarly buttons 39 and prongs 40, could be formed as a continuous structure with the spring action created by a smaller width of plastic at the hinge axis. The overall outer surface of the clasp 6 and 7 is of a preferred rubber texture. The lower image shows the female clasp lip 45 and the male tongue 44 on the base 21 of clasp 6 lower which facilitates connecting the clasps together before the clasp is locked or released. An example circuit board 42 containing at least one integrated hub controller chip 20 attached to the USB connector 19 is also shown and would be connected directly to the internal strap membrane 14 for connectivity through to the individual docking nodes 4 and circuit boards 15.

Figures 6A, 6B:
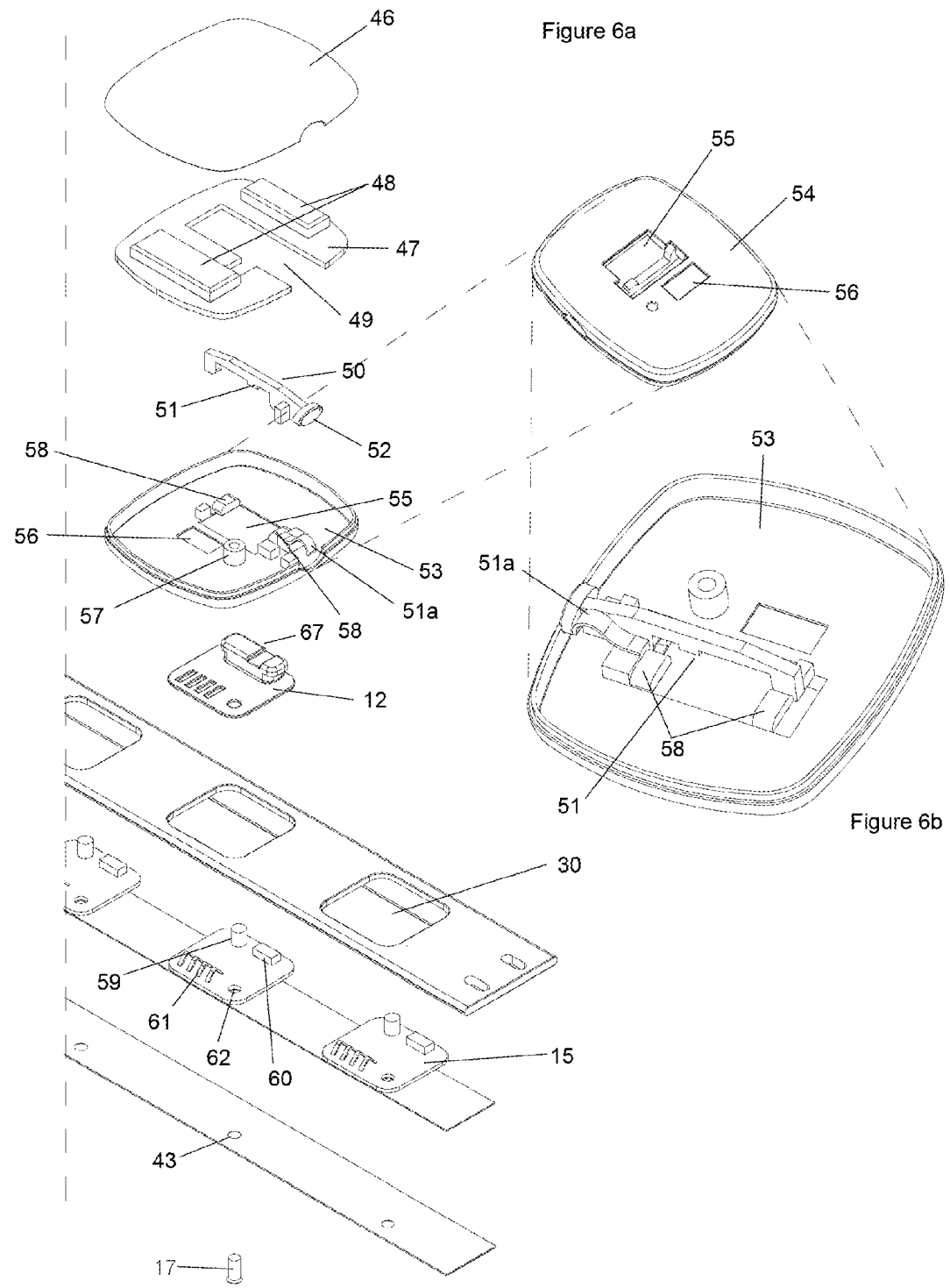
FIG. 6A. shows an exploded view of a wristband strap docking point and electrical and mechanical connector clips as well as an exploded view of an example module.
FIG. 6B shows an enlarged 3D view of the base of an example module.
Figure 7A:
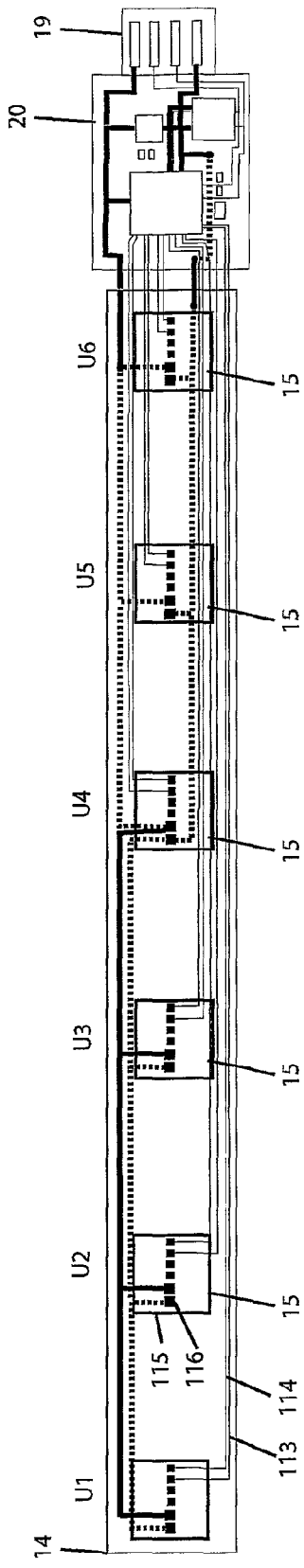
FIG. 7 shows a high level electronic architecture for circuitry forming the wrist-based Hub and network
Figure 7D:
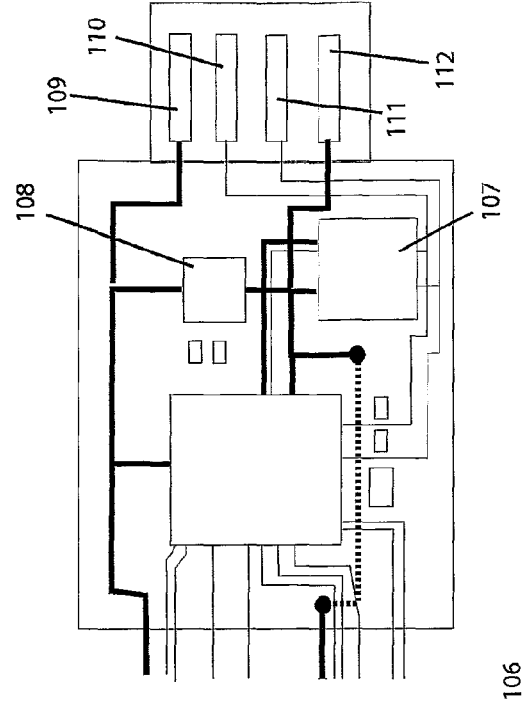
Figure 7C:
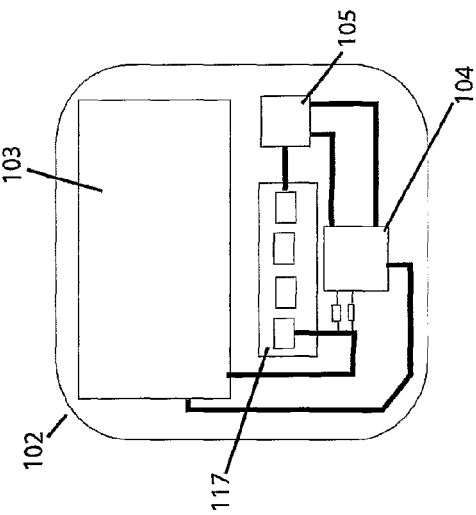
Figure 7B:
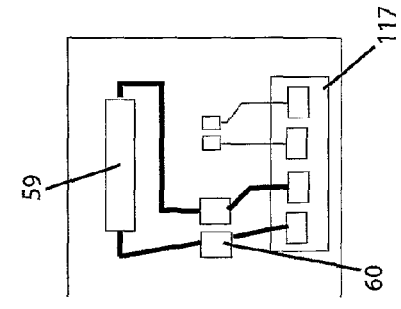

Referring now to FIG. 6 which shows an exploded view of a module 8 attached to the strap 2 and the components making up the strap docking node 4. The module 8 is positioned over the vertical prong 67 of the node 4 circuit board 15 and cover 12 by means of a slot 55 in the base 53 of the module 8. The act of pushing down the module has the effect of sliding the sprung locking bar 51, which is sprung by member 51a, slightly as it makes contact between the curved edge form of the vertical prong 67 and the underside curve on the locking bar 51 without need to press the release button 52. The locking bar 51 position has a side profile 50 that then corresponds to the side profile of the vertical prong 67 such that the module can be slid laterally onto the rails 58 in the module base 53 so that the rails 58 fit under flanges on the edges of the vertical prong 67 which securely fasten the module to the strap node unit 4. The locking bar 51 then springs back locking the module 8 to the strap such that it cannot be removed unless the release button 52 is pressed and the module slid sideways and lifted off. Once the module is in place the sprung electrical connectors 61 on the node circuit board 15 make contact with reciprocal connectors on the base of the circuit board 47 by means of a recess 56 in the module base 53 in a similar manner to a flash or phone SIM card. The vertical positioning pin 17, can also spring into place through holes 62 and 43, to provide additional stability or be replaced with a locking screw if required. The overall rectangular shape of the vertical prong 67 and hole 55 combined with the locking bar 51 is designed to provide rigidity to the module such that it won't twist or shear once in place on a wristband. An example circuit board 47 is shown covering the majority of the area of the module and supporting a plurality of chips 48 and containing a slot 49 for the module locking mechanism and node prong 67. Optionally the circuit board could support additional advanced power management circuitry such as larger capacitors, should the application require it. An example module lid 46 is also shown, though in practice this could be a screen, as in module 11 or a form of interface as in module 10. The module could be of different size or shape and is only limited by the spacing between docking nodes 4 on the strap and the fastening mechanism components 55, 58, 51. It will be appreciated that the lateral sliding fastening mechanism illustrated here as a preferred configuration could be adjusted in dimension or reformed as a rotational sliding or vertical locking mechanism, similarly the locking bar could be likewise adjusted. FIG. 6B shows an enlarged view of the module base 53 showing the underside surface 54 and the internal structure more clearly showing the hole 55, locking rails 58 and side profile 50 of the locking bar 51.

Referring now to FIG. 7 which shows a high level electronic schematic for circuitry forming the wrist-based Hub. FIG. 7A shows example wiring that would form the flexible electrical membrane layer 14, connecting the clasp circuitry 20 to individual node circuit boards 15, which in this case represent six USB ports, U1, U2, U3, U4, U5 and U6. FIG. 7B shows an enlargement of an example PCB making up an individual circuit board 15, which supports connectors (e.g. 115, 116) on the underside to permanently connect to the wire ports on the flexible electrical membrane 14 and internal circuitry for power management and voltage regulation 60 by means of local capacitors 59, encased within the node cover 12 and vertical docking node prong 67 and four metal USB connector prongs 61 that form the downstream USB port to electrically connect to external modules 8. FIG. 7C shows an example removable battery module 102 that supports additional power management circuitry by means of a regulator 104 and switch 105, to mitigate power surges when connecting the module via the USB connector 117 to prongs 61 on the strap and circuit board 15. Preferably said battery module 102 would contain circuitry to help manage complex power management between multiple battery modules, and embedded batteries within other modules and the clasp, as well as switch into a charging mode when the overall wrist-strap is attached to an external host or recharging cradle. FIG. 7D shows an enlargement of an example circuit forming the clasp circuitry 20, and comprising a hub controller 106, an embedded host 107, and power regulator circuitry 108. Said embedded host 107, would dynamically switch control to an external host when connected via the USB upstream port 19, using mechanical or software means (such as via the USB On the go protocol). Said USB upstream port containing 4 wires, being for example 109 for VBus, 110 for data, 111 for clock and 112 for ground. Optionally overall circuitry 20 could be distributed via flexible electronics within the strap 14, or at the opposite end of the strap and embedded within the female portion 85 of the joining clasp.

SECOND EMBODIMENT

Figure 8A:
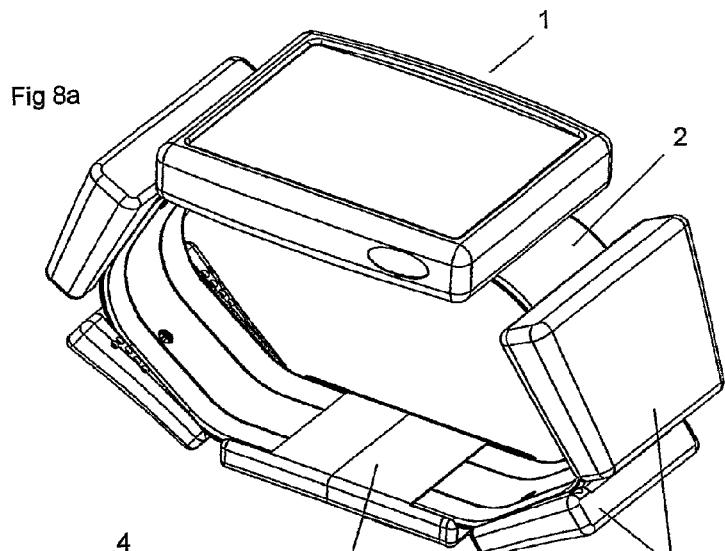
FIG. 8 shows a three dimensional view of the modular wristband configured as a handset in a closed configuration, as it might appear on a wrist, with FIG. 8A showing a wristband containing a full assembly of modules, FIG. 8B a wristband strap with no modules and FIG. 8C a side elevation view through the wristband.
Figure 8B:
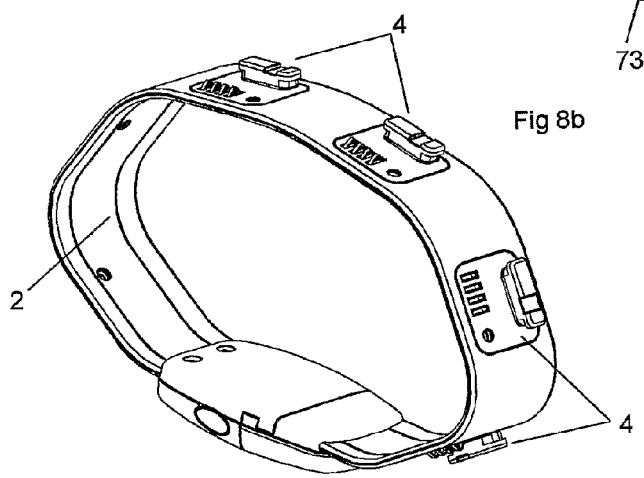
Figure 8C:
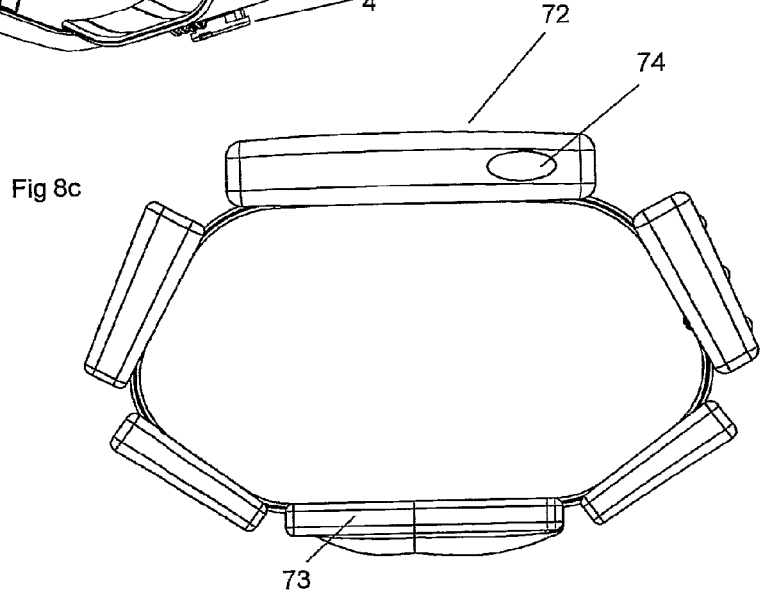

Referring to FIG. 8A, which shows a 3-dimensional profile of the overall modular wristband device 1 configured as a wristbased handset and shown in a closed configuration and comprises a flexible strap 2 connected to a clasp embodiment 73 which joins alternate ends of said strap so as to form a loop, where said strap 2 contains a plurality of removable modules 5 arranged at preferred regular intervals around the strap and secured by means of docking points or nodes 4 which serve to electrically and mechanically connect the strap 2 with the modules 5. FIG. 8B shows a 3-dimensional profile of the wristband with all modules removed and more clearly shows the arrangement of docking nodes 4 in around the strap 2, along with an alternative fold out design clasp 3 of clasp embodiment 73. FIG. 8C shows a side view of said modular wristband device 1, showing a main control module 72 with side control buttons 74.

Referring now to FIG. 9A, which shows a 3-dimensional profile and FIG. 9B a side profile of the overall modular wristband device 1 in an open configuration forming a curved handset and supporting a removable central module 72 preferably with touch sensitive screen face 75, and side buttons 74, and removable modules 77, 76, 78, 80 which by way of illustration correspond to a battery and earpiece unit 77 with demountable wireless earpiece 79, a data storage module 76, a wireless connectivity and sensor module 78 supporting LED indicators 86 to show the strength of various signals that could also act as selector switches, a microphone and battery unit 80 supporting a demountable button microphone clip 81. The joining clasp 73 can be seen to be made from a female unit 85 and male unit 83 which contains a typical connector such as a USB jack 84 as well as hub and host control circuitry (See FIG. 7). Similarly circuitry and battery capacity could be located in the female clasp 85.

Referring now to FIG. 10A which shows a three dimensional profile of the overall modular wristband device 1 in an open configuration forming a curved handset and supporting a removable central module 72 preferably with touch sensitive screen face 75, and side buttons 74, and removable modules 77, 76, 78 and 87 (representing a generic accessory module such as a health sensor), where earpiece 79 is shown demounted from its module 77 and shows an ear-clip 89 and audio earplug 88 that has sprung folded out from the module. Similarly module 87 is shown removed from the strap node 4 and could be substituted for another module. The control module 72 shows a screen 75 which could be formed from LED/LCD or OLED display technologies, and preferably supports a capacitive touch sensitive roll area. FIG. 10B shows a cross-section through the strap 2 showing the layers making up the overall docking node 4 which will be more clearly seen in FIG. 3B and FIG. 8, and a dotted cross-section showing the profile of an example attached module 8.

Figure 11:
FIG. 11 shows a sketch of a person holding the wristband deployed as a handset

Referring now to FIG. 11 which shows a consumer holding the deployed handset 1 as it might be used, where fingers can easily access side-buttons 74 on the central module 72, and screen 75 could be used to dial graphically displayed numbers, or select a caller from a list of ids.

Figure 12A:
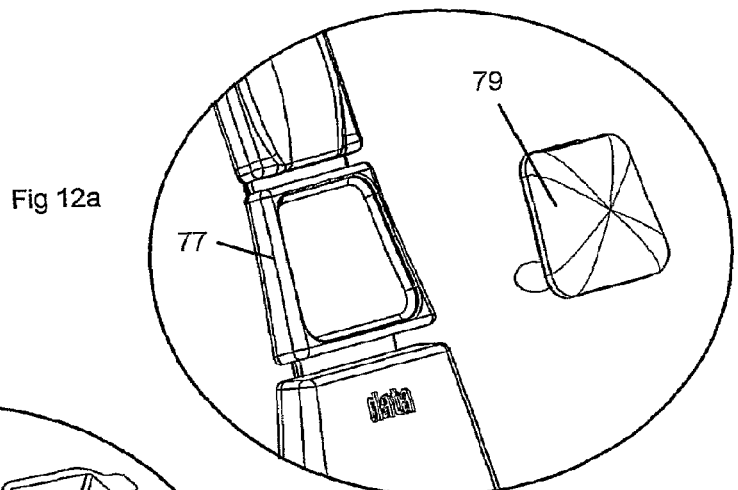
FIG. 12 shows a three dimensional view of an embodiment of a demountable wireless earpiece being attached to the wrist strap and in use, with the earpiece supporting a fold out ear clip.
Figure 12B:
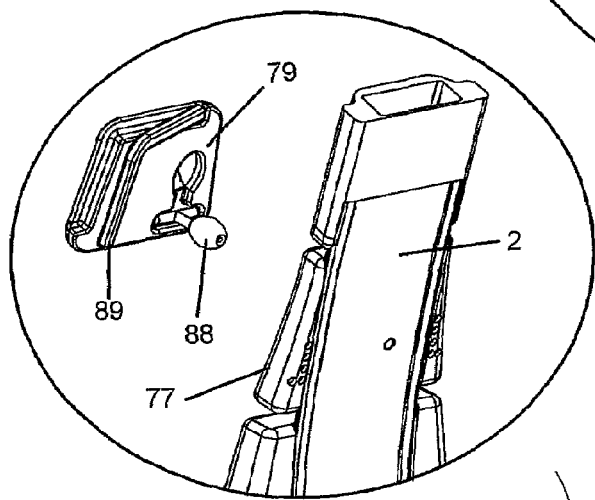
Figure 12C:
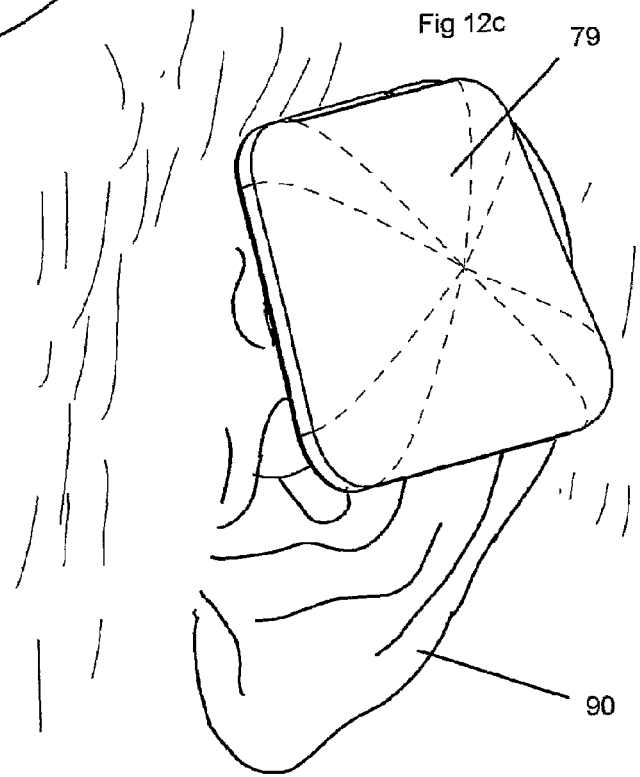

Referring now to FIG. 12 which shows an embodiment of a demountable earpiece 79 removed from its module 77 which remains attached to the wrist strap 1. FIG. 12B shows a reverse side view of the wireless earpiece 79 showing the fold out earplug 88 and foldable ear-clip 89, both of which would be sprung so that they pop into place when the earpiece 79 is removed from its module port 77, and which would be folded back into place by the action of securing the earpiece 79 back in its module port 77. FIG. 12C shows how the device might appear when attached to an ear 90. Similarly the microphone button clip 81 attached to module 80 (in FIG. 9) would be demountable and usable in a similar way. Earpiece casing 79 would support a rechargeable battery and wireless connectivity circuitry (such as Bluetooth or USB Wireless) to enable short range connectivity to the wristband worn on the person, with connector nodes (not shown) that would link to connector nodes on the module port 77, that are directly connected to the Strap port node 4, to enable data exchange and recharging.

Figure 13A:
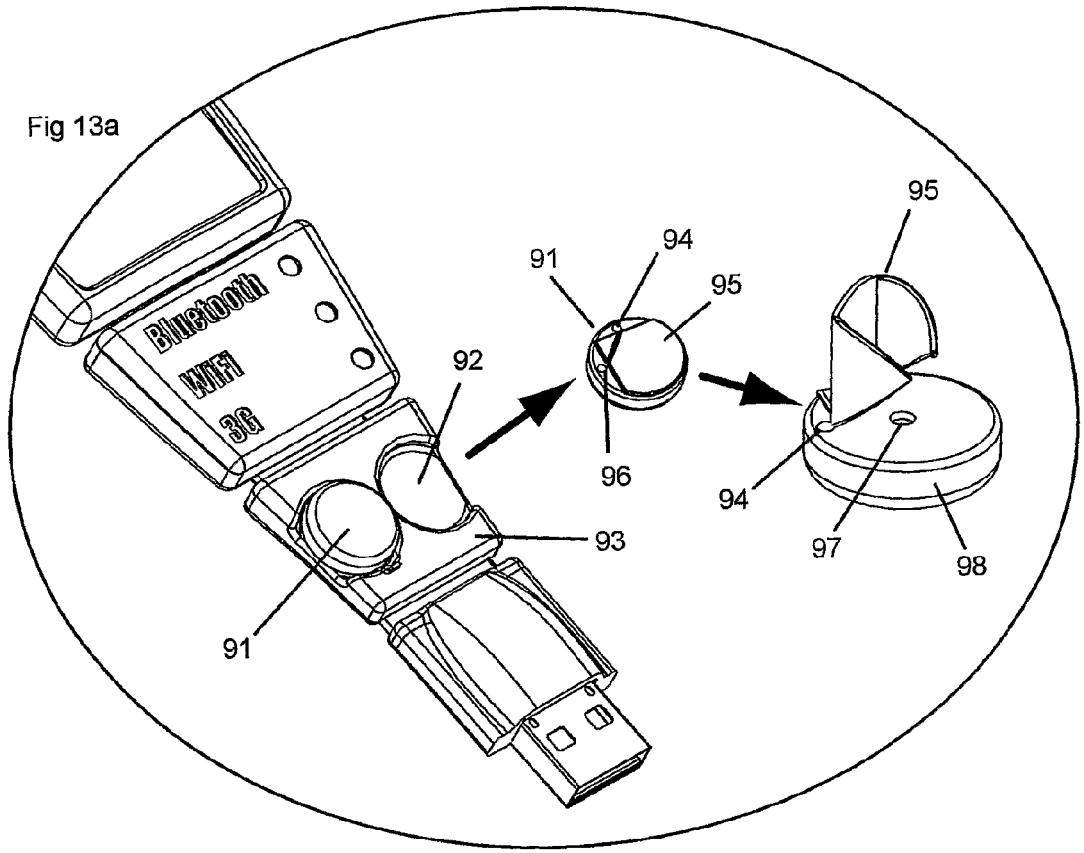
FIG. 13A shows a further embodiment of a demountable earpiece incorporating a flexible or bi-stable material for the earplug.
Figure 13B:
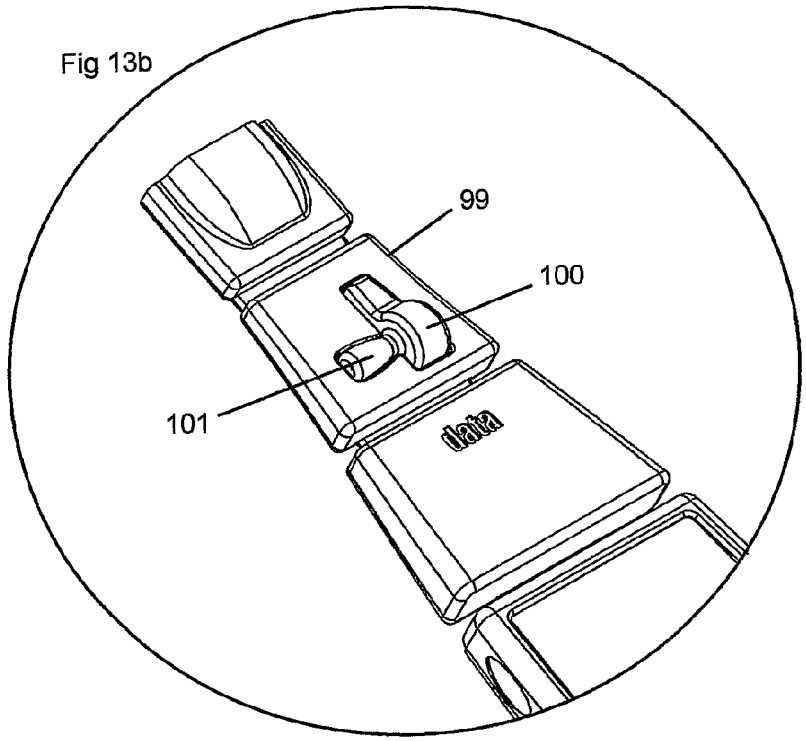
FIG. 13B shows a further embodiment formed as an earplug.

Referring now to FIG. 13 which shows alternate embodiments of demountable earpieces in FIG. 13A and FIG. 13B. FIG. 13A shows an example of a miniature earpiece 91 secured in a module 93 supporting grooved recesses 92. In this embodiment two earpieces can be secured on a single module, suitable for left and right ear audio purposes. The reverse of an earpiece 91 supports connector ports 94 for recharging purposes and would use a wireless chip embedded in casing 98 for data and audio connectivity with the wriststrap device 1, and would contain a rechargeable battery unit embedded within the casing 98. In this embodiment the earplug is preferably formed from a bi-stable elastic and rubbery type material that is biased to fold up along a hinge line 96 and form a cylindrical shape 95 when deployed that can conveniently secure the earplug within the ear. Said earplug 95 could be biased by means of the elastic composition of the material and optionally integral fibres having different tensile and compressive strengths. The earplug thereby forming a flexible cylinder that could be adapted for a range of ear sizes, and being easily flexible to store in a compact a generally planar form when the overall earpiece 91 is positioned within the grooved recess 92 on the module 93. FIG. 13B shows a further embodiment of a demountable earpiece 100 comprising a solid rubber earplug 101 positioned within a module 99. The modularity thus allowing a wide range of earpiece forms to be selected by the user and stored conveniently on a wrist strap.

THIRD EMBODIMENT

Referring now to FIG. 14 which shows a further embodiment of the modular wristband device where the strap 2 is formed as a thicker semi flexible structure 118 supporting side recesses 119 for the removable modules 8 that connect laterally into docking points 4. Said strap 118 provides a generally flat external surface over all the modules 8, a transparent module window 121 and could optionally support a fixed touch sensitive input device area 120. Said strap generally formed from a flexible rubber material and being versioned with various overall joint lengths and arranged as semi-rigid fixed size module recesses interconnected by flexible joints, where said joints could also include a mechanical axel or hinge joint, and supporting a suitable clasp 3 containing control circuitry 20 and connector 19. FIG. 14A shows an exploded view of this modular wristband embodiment generally configured with a large combination central module 31 such as a media player or PDA device which occupies the equivalent of two docking points on the regular strap. In this example additional modules 8 are illustrated as a battery 24 and extended media data storage module 29, together with an earpiece module 77. Said modules 8 having an exposed recess 56 to allow the electrical connector pins on the module circuit board 47 to laterally connect with connection prongs 61 on the equivalent circuit board 15 of the docking node 4. FIG. 14B shows the overall device 1 in an open configuration such that it could be connected to an external PC or recharging device via connector 19 and 14C in a closed configuration as it might appear on a wrist.

Figure 15A:
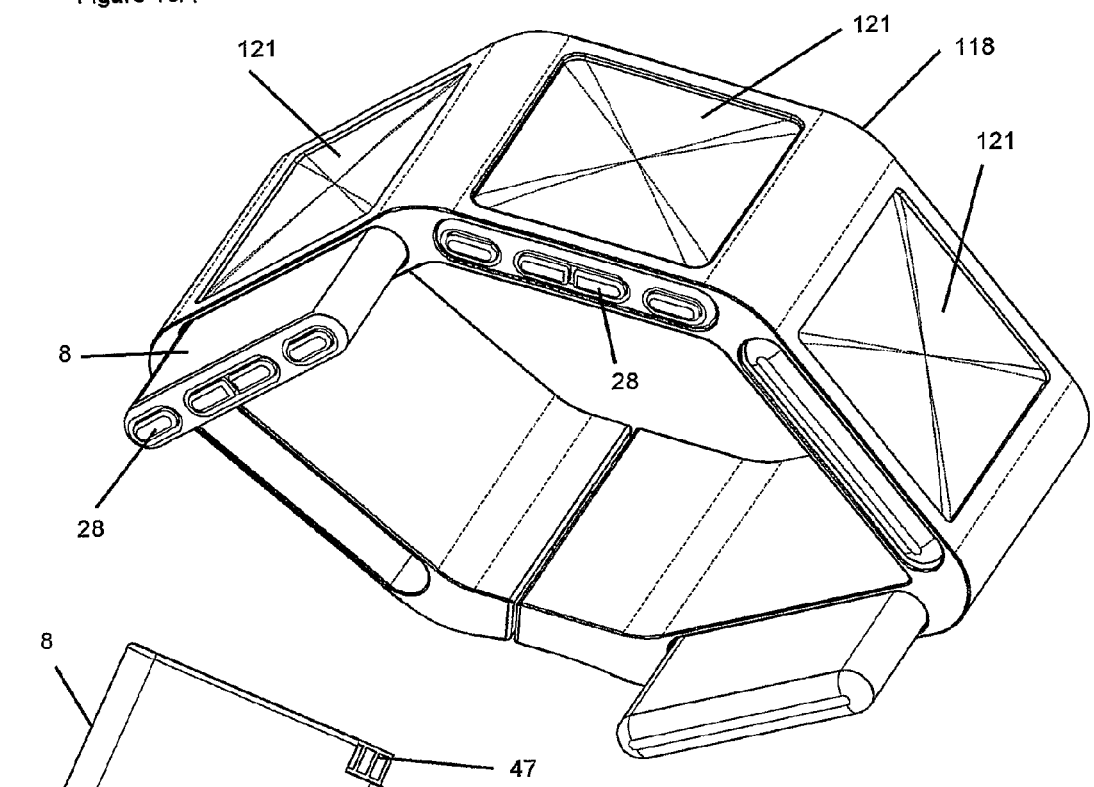
FIG. 15 shows a three dimensional view of a further embodiment of the modular wristband where the strap is formed as a thicker Semi flexible arranged in FIG. 15A for identically sized modules.
FIG. 15B shows the wristband in a closed configuration.
FIG. 15C shows an embodiment of a docking point circuit layout contained within this thicker flexible structure.
Figure 15B:
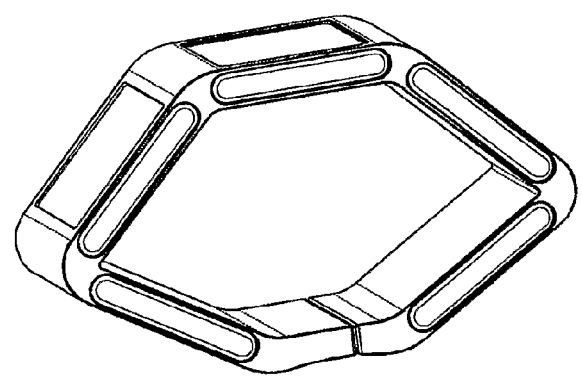
Figure 15C:
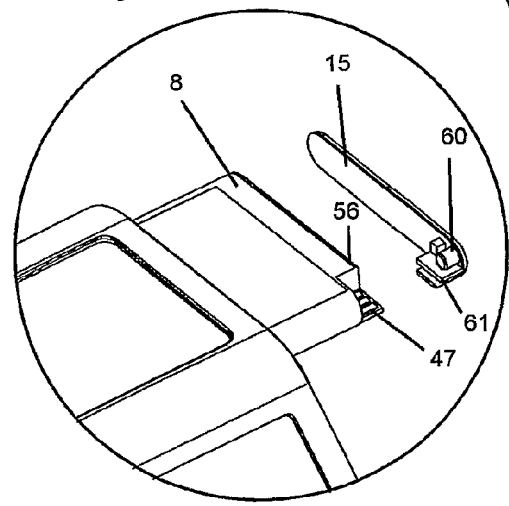

Referring now to FIG. 15A which shows a three dimensional view of a further embodiment of the modular wristband where the strap is formed again as a thicker Semi flexible structure 118 and arranged in this embodiment with regular modules 8 rather than a combination module 31, and shown with a series of module windows 121 that could in a further embodiment be touch-sensitive. A series of modules 8 are shown supporting side buttons 28 and could by way of example form a Personal Digital Assistant formed from individual data, connectivity, processing and input modules connected via the hub circuitry and network embedded within the strap 118. FIG. 15B shows the wristband embodiment in a closed configuration. FIG. 15C shows an embodiment of a docking point circuit layout 15 arranged vertically and encased within the strap 118 as opposed to the Flat illustration in FIG. 3, and shown to support a capacitor 60 and electrical connecting prongs 61 to electrically connect with surface mounted connectors on the module circuit 47 in a similar manner to a SIM card connection. Said circuit layout 15 generally supporting further voltage regulation and low profile control circuitry and being similarly connected to a flexible membrane 14 (not shown in this embodiment) that electrically connects all docking node circuit layouts 15 with the hub control circuitry 20 in the clasp 3.

Referring now to FIG. 16A which shows a three dimensional exploded view of an example module 8 with lid 46 and example internal circuitry 48 on circuit board 47 that supports electrical connectors 122 on alternate sides to connect with docking node 4 prongs 61. Said connectors being used for bus communication and generally being two of power and two of data to electrically connect to the strap wires Vbus 109, data 110, clock 111 and ground 112, with a further two connectors being used to provide alternate upstream connection, generally used where the module is a power source.

Referring now to FIG. 16B which shows an example earpiece module embodiment 77 as a sliding tray that supports in recesses 92 removable wireless earpieces 100 that have flexible rubber earplugs 101, where said earpieces contain appropriate battery and wireless connectivity circuitry and electrically connect when stored to module circuitry 48 and 47 for the purposes of recharging when stored on the strap device 2. Said circuitry 48 generally supporting wireless circuitry to communicate with the earpieces. Said sliding tray capable of being slid out of the module recess 119 without removing the overall module 77 from the strap 118, and preferably having a sprung push release mechanism to allow for easy earpiece deployment.

FOURTH EMBODIMENT

Referring now to FIG. 17. which shows a 3-dimensional profile of an overall modular necklace device 63 is a closed configuration which comprises a flexible strap 65 connected to a clasp 68 which joins alternate ends of said strap so as to form a loop, where said strap 65 contains a plurality of removable modules 8 arranged at preferred regular intervals around the strap and secured by means of docking points or nodes 4 which serve to electrically and mechanically connect the strap 65 with the modules 8. Said node units 4 are attached to the strap by means of a shaped base unit 66 which affixes to the strap 65 at each side. Said clasp 68 is similar to clasp 3 except has preferably rounded sides and is more shaped as might be suitable to rest at the back of a neck. Said overall modular necklace device 63 functions in a similar way to the modular wristband device 2 in that modules 8 are removable and interchangeable by means of the common docking points 4. Similarly a smaller cover filler cap 69 could be added to cover over an unused docking point 4, said cap 69 being of ornamental surface design and style.

Referring now to FIG. 18 which shows a 3-dimensional exploded profile of a module 8 attached to the necklace strap 65 by means of a docking node 4. The module 8 contains a lid 46 and base unit 53 with internal circuitry and chips 48. Said module contains a locking bar 51 with external release button 52 attached to a plastic spring formed as part of the overall mould. Said bar 51 contains a side profile 50 that can allow the node prong 67 to slide under when attached, and locking rails 58 to sandwich the upper profile of the node prong 67 and secure it in place. The base 53 also contains a cylindrical hole 57 suitable for containing a locking screw or sprung positioning bolt. Key components of the node 4 are also shown, being the cover 12, the circuit board 15. The circuit board 15 would be attached via a membrane to the wires within the strap wire 65. A node base unit 66 is shaped to encase the lower side of the node 4 and secure the strap wire 65 on either side. Said base unit 66 plays the same role as the overall strap sections 2 (formed from 13, 14, and 16) in the modular watch strap.

Although the wearable modular interface strap invention is described and illustrated with reference to several preferred embodiments of a wristband arranged as a general modular device, as a deployable handset and as a partially enclosed form and in another arrangement as a necklace it is expressly understood that it is in no way limited to the disclosure of such preferred embodiments, but is capable of numerous modifications within the scope of the claims. By way of example the strap could be produced with a different number of docking points at different spacing, similarly the docking point could be used in other wearable devices such as on a pendant, belt or directly on clothing. By way of further example the mechanical docking point could be implemented in a rotational manner, or as a vertical release mechanism.

The invention claimed is:

1. A wearable modular interface strap device comprising:
a plurality of mechanical and electrical interface docking points arranged around a flexible strap capable of supporting a plurality of removable modules;
a clasp to allow a person to manually close and fasten the overall device as a loop such that it can be worn on the person;
a connector embedded within the clasp which is made accessible when the clasp is opened for allowing at least one of a power and data connection to be made to the device from an external device, wherein the clasp has a male component comprising said connector and a female component arranged to attach to the male component and encase the connector when the clasp is closed; and,
a plurality of wires which electrically connect each of the said docking points to the connector and circuitry to enable data communication between the connector, the circuitry, the docking points and the attached modules;
the docking points providing a mechanical mechanism to enable modules to be attached and locked, and removed, without opening the strap, and an electrical mechanism and circuitry to enable power and data connectivity with an attached module such that said attached module can be removed or attached without electrical disruption to other modules.

2. A device according to claim 1, wherein said strap is arranged as a wristband supporting the plurality of mechanical and electrical docking points and suitable to be worn as a loop on a wrist and being capable of being connected to an external device by the connector when the strap is open.

3. A device according to claim 1, wherein said strap supports at least one earpiece and at least one microphone suitable for the overall device to be used for communication purposes.

4. A device according to claim 3, constructed and arranged so as to be usable for communication purposes when being worn on the wrist.

5. A device according to claim 3, constructed and arranged so as to be usable for communication purposes when being open and deployed as a handset.

6. A device according to claim 3, and at least one removable control module with a display and an interface, at least one removable audio-enabled module, and at least one removable connectivity module, suitable for the overall device to be used for Voice-Over-IP and/or mobile communication.

7. A device according to claim 3, and at least one removable module that provides a demountable earpiece that connects using a wireless link to the strap.

8. A device according to claim 7, wherein said demountable earpiece comprises an encased wireless connectivity chip and battery unit, and a collapsible sprung earplug that is arranged to fold out as the earplug unit is removed from said module and can be re-collapsed by the action of re-attaching the earpiece to said module.

9. A device according to claim 7, wherein said earpiece is formed from a flexible elastic or bi-stable material that is biased towards a preferred curved deployed form that is suited to being used within an ear, and a generally planar form when stored within said module.

10. A device according to claim 3, wherein a demountable wireless microphone is provided with an encased wireless connectivity chip and battery unit that can be stored on a module when not deployed.

11. A device according to claim 3, and a connectivity module that uses a sensor and display to indicate general electromagnetic signal strengths across frequencies for mobile connectivity.

12. A device according to claim 3, and a removable central control unit module that enables selection between available connectivity sources, and provides suitable Voice-Over-IP, GSM, GPRS or 3G codec processing to manage packet based voice communication between the device and a base-station and to provide audio feeds to a microphone and speaker located on strap modules, or via USB or Bluetooth wireless connectivity to local wireless audio devices.

13. A device according to claim 3, and a health sensor module where data is recorded and transmitted wirelessly via a removable wireless module to enable health monitoring and alerts.

14. A device according to claim 1, wherein said strap is arranged as a modular necklace comprising a tubular flexible strap supporting the plurality of docking points and suitable to be worn as a loop around a neck and secured by the clasp at each end.

15. A device according to claim 1, wherein said electrical interface at a docking point is a serial bus interface comprising at least four metal prongs for power, ground, data and clock line connection between wires in the strap and a module connected to the docking point.

16. A device according to claim 1, wherein said overall device can act as a hub when open and connected via said connector for the purposes of recharging and data-exchange with an external host device, by control circuitry in the clasp, and local control circuitry attached to each docking point.

17. A device according to claim 1, wherein said overall device can act as a local network when not attached to an external device for the purposes of data-exchange and for access to resources on modules attached to other docking points on the strap, by host control circuitry in the clasp and local power management circuitry in the docking point and attached modules.

18. A device according to claim 1, wherein at least one docking point is assembled in layers comprising a circuit board electronically connected to a wire membrane in the strap and a cover for encasing local circuitry, chip and capacitance, wherein said cover contains a vertical prong shaped to be suitable for mechanically connecting to an attached module.

19. A device according to claim 1, wherein said strap is assembled in layers comprising: a flexible upper layer containing holes, docking point circuit boards supported in said holes, a flexible interior membrane layer containing wires connecting to an external connector in the clasp and connecting to and supporting the docking point circuit boards, and a lower layer for sealing the whole unit as a strap.

20. A device according to claim 1, wherein
said male component comprises a lid, a universal serial bus connector, control circuitry and chips, and a lower base unit; and,
said female component comprising a hinged lid and lower base unit, wherein said female component contains a locking block for attaching to the strap at various points and thereby varying the strap length.

21. A device according to claim 20, wherein said clasp comprises a tongue on the male component and a lip or groove on the female component such that the male component can hook over the female component as the clasp is being connected and the hinged lid folds down, encases and secures the overall assembly.

22. A device according to claim 1, including at least one removable module that provides at least one function of battery power, information display, control circuitry, data storage, a user interface, external sensing, communication functions, and extendibility for further functionality.

23. A device according to claim 22, wherein a mechanical lock in at least one docking point and in the base of said module enable said module to be slid laterally and locked into position on the strap without removing the strap from the person, and to be released by pressing a sprung button attached to said mechanical lock.

24. A device according to claim 23, wherein said mechanical lock is provided by a locking bar in the module having an underside profile that matches a vertical prong profile on the docking point, wherein the module has a hole with adjacent locking rails that secure the vertical prong when the module hole is positioned down over the vertical prong and slid laterally, and wherein said sprung locking bar is arranged to be displaced by the action of positioning and sliding the module over the vertical prong and to spring back thereby locking the module in place.

25. A device according to claim 24, wherein additional locking is provided by a sprung positioning pin or screw affixed to the module through holes in the strap.

26. A device according to claim 22, wherein the module comprises at least a locking mechanism suitable for connecting to the docking point, connector plates for connecting to four metal serial bus connectors on the docking point when the module is attached, and a circuit board containing at least one chip.

27. A device according to claim 22, wherein the module is a combination unit occupying two docking points on the strap, using at least one set of serial bus connectors, capable of being slid laterally into place as with a single module, and containing at least a display, interface device and control circuitry.

28. A device according to claim 22, wherein all modules are battery units and at least one battery unit contains a wire for connecting to another wearable device such that the combination acts as a power-pack device.

29. A device according to claim 22, wherein at least one modular unit provides wireless communication to allow any module on the strap to communicate wirelessly with an external device.

30. A device according to claim 1, and a docking station suitable for recharging the device and supporting additional electrically connected and spare modules.

31. A device according to claim 1, and at least one removable filler unit of largely ornamental appearance serving to cover a docking point not being utilized by a module.

32. A device according to claim 31, wherein said filler unit has an interchangeable lid capable of other style forms and capable of using the power lines and battery power within the strap for LED or electroluminescent or other light effects.

33. A device arranged as a wristband and comprising a substantially flat and flexible strap supporting a plurality of mechanical and electrical interface docking points arranged around a flexible strap capable of supporting a plurality of removable modules, with a clasp lock at each end to allow a person to manually close and fasten the overall device as a loop such that it could be worn on the person, where said strap contains a plurality of wires which electrically connect each of the said docking points to an external connector embedded within the clasp which is made accessible when the clasp is opened, wherein the clasp has a male component comprising said connector and a female component arranged to attach to the male component and encase the connector when the clasp is closed, and circuitry to enable data communication between docking points and attached modules, where said wristband can act as a hub for the attached modules when open and as a local network for connectivity between modules when closed, with said docking points providing a mechanical mechanism to enable said modules to be easily attached and locked, and removed laterally by a release mechanism without opening the strap, and said docking points providing a serial bus electrical mechanism and circuitry to enable power and data connectivity with an attached module such that it could be removed or attached without electrical disruption to other modules, where said modules are capable of providing a plurality of electrical device functions and includes at least one battery unit, at least one display unit, at least one interface unit, and at least one memory and control unit and could include at least one module filler unit acting to encase a docking point interface not in use by a module.

* * * * *